US010789775B2

(12) United States Patent
Maier et al.

(10) Patent No.: US 10,789,775 B2
(45) Date of Patent: Sep. 29, 2020

(54) METHOD FOR CONTROLLING AN OBJECT

(71) Applicant: BECKHOFF AUTOMATION GMBH, Verl (DE)

(72) Inventors: Clemens Maier, Bludenz (AT); Armin Pehlivan, Nueziders (AT); Thomas Morscher, Vienna (AT); Stefan Wapelhorst, Wadersloh (DE); Christian Henke, Feldkirch (AT)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 15/650,277

(22) Filed: Jul. 14, 2017

(65) Prior Publication Data
US 2018/0018826 A1  Jan. 18, 2018

(30) Foreign Application Priority Data

Jul. 15, 2016  (DE) .................. 10 2016 113 060

(51) Int. Cl.
  *G06T 19/00* (2011.01)
  *G06F 3/01* (2006.01)
  (Continued)

(52) U.S. Cl.
  CPC .......... *G06T 19/006* (2013.01); *G05B 19/409* (2013.01); *G06F 3/011* (2013.01);
  (Continued)

(58) Field of Classification Search
  CPC .. G06K 9/00664–00704; G06F 3/0481; G06F 3/04817; G06F 9/4443;
  (Continued)

(56) References Cited

U.S. PATENT DOCUMENTS

2005/0166163 A1\* 7/2005 Chang ................ G06F 3/017
  715/863
2005/0225453 A1\* 10/2005 Chang ................ G06F 3/017
  340/12.22
(Continued)

FOREIGN PATENT DOCUMENTS

EP  2642331 A1  3/2012
EP  1709519 B1  3/2014
(Continued)

OTHER PUBLICATIONS

ExpovistaTV, "Autodesk Maya and Microsoft HoloLens: amazing demo," YouTube, Jul. 13, 2015, website, https://www.youtube.com/watch?v=yADhOKEbZ5Q&feature=youtu.be.
(Continued)

*Primary Examiner* — Todd Buttram
(74) *Attorney, Agent, or Firm* — Dorsey & Whitney LLP

(57) ABSTRACT

Method for controlling an object, wherein the object is arranged in the real space and is linked to at least one virtual element of a character space, wherein the object, a depiction device, an operator control device and/or a control device are functionally connected to one another, having the steps of ascertaining a position and an orientation of the operator control device and/or of the depiction device in relation to the object, generating a virtual pointer from the ascertained position and the ascertained orientation of the operator control device and/or of the depiction device, selecting the object by means of the virtual pointer, depicting the object, augmented with the at least one element of the character space, by means of the depiction device, and/or controlling the object by means of the operator control device.

13 Claims, 19 Drawing Sheets

(51) Int. Cl.
*G06F 3/0346* (2013.01)
*G05B 19/409* (2006.01)
*G05B 23/02* (2006.01)
*H04N 21/40* (2011.01)

(52) U.S. Cl.
CPC .............. *G06F 3/012* (2013.01); *G06F 3/013* (2013.01); *G06F 3/014* (2013.01); *G06F 3/0346* (2013.01); *G05B 23/0216* (2013.01); *G05B 2219/32014* (2013.01); *G05B 2219/39449* (2013.01); *H04N 21/40* (2013.01)

(58) Field of Classification Search
CPC .. G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 2006/0241792 A1 | 10/2006 | Pretlove et al. | |
| 2007/0162863 A1* | 7/2007 | Buhrke | G06F 3/04815 715/757 |
| 2009/0106671 A1* | 4/2009 | Olson | G06F 16/487 715/757 |
| 2009/0189855 A1* | 7/2009 | Wei | G06F 3/0488 345/157 |
| 2009/0300535 A1* | 12/2009 | Skourup | G06F 3/011 715/773 |
| 2009/0322671 A1* | 12/2009 | Scott | G06K 9/32 345/156 |
| 2010/0315336 A1* | 12/2010 | Butler | G06F 3/017 345/158 |
| 2011/0095978 A1 | 4/2011 | Pehlivan et al. | |
| 2012/0249531 A1* | 10/2012 | Jonsson | G06F 3/011 345/419 |
| 2014/0152558 A1* | 6/2014 | Salter | G06F 3/013 345/157 |
| 2015/0097775 A1* | 4/2015 | McCartney | G06F 3/0346 345/158 |
| 2015/0262405 A1* | 9/2015 | Black | G06T 17/00 345/420 |
| 2015/0331484 A1* | 11/2015 | Peterson | G06K 9/00604 345/156 |
| 2016/0044463 A1* | 2/2016 | Lee | H04W 4/025 455/456.1 |
| 2016/0196692 A1* | 7/2016 | Kjallstrom | G06T 19/006 345/633 |
| 2017/0336882 A1* | 11/2017 | Tome | G06F 3/0346 |
| 2018/0061003 A1* | 3/2018 | Kono | G06F 3/012 |

FOREIGN PATENT DOCUMENTS

| | | |
|---|---|---|
| EP | 2755113 A2 | 7/2014 |
| WO | 2007066166 A1 | 6/2007 |
| WO | 2009132920 A1 | 11/2009 |

OTHER PUBLICATIONS

Jones, "Who You Gonna Call—VR Hackathon 2014," YouTube, Oct. 20, 2014, website, https://www.youtube.com/watch?v=vtITIosOc0Q.

Lumera, "Is Augmented Reality the future of technical documentation," tcworld, Mar. 2013, pp. 1-4, accessed online on Oct. 22, 2015, website, http://www.tcworld.info/rss/article/is-augmented-reality-the-future-of-technical-documentatiorv.

Tactical Haptics, "Reactive Grip™ Gravity Gun Demo," YouTube, Feb. 10, 2015, website, https://www.youtube.com/watch?v=ckyvKJZWT9c.

* cited by examiner

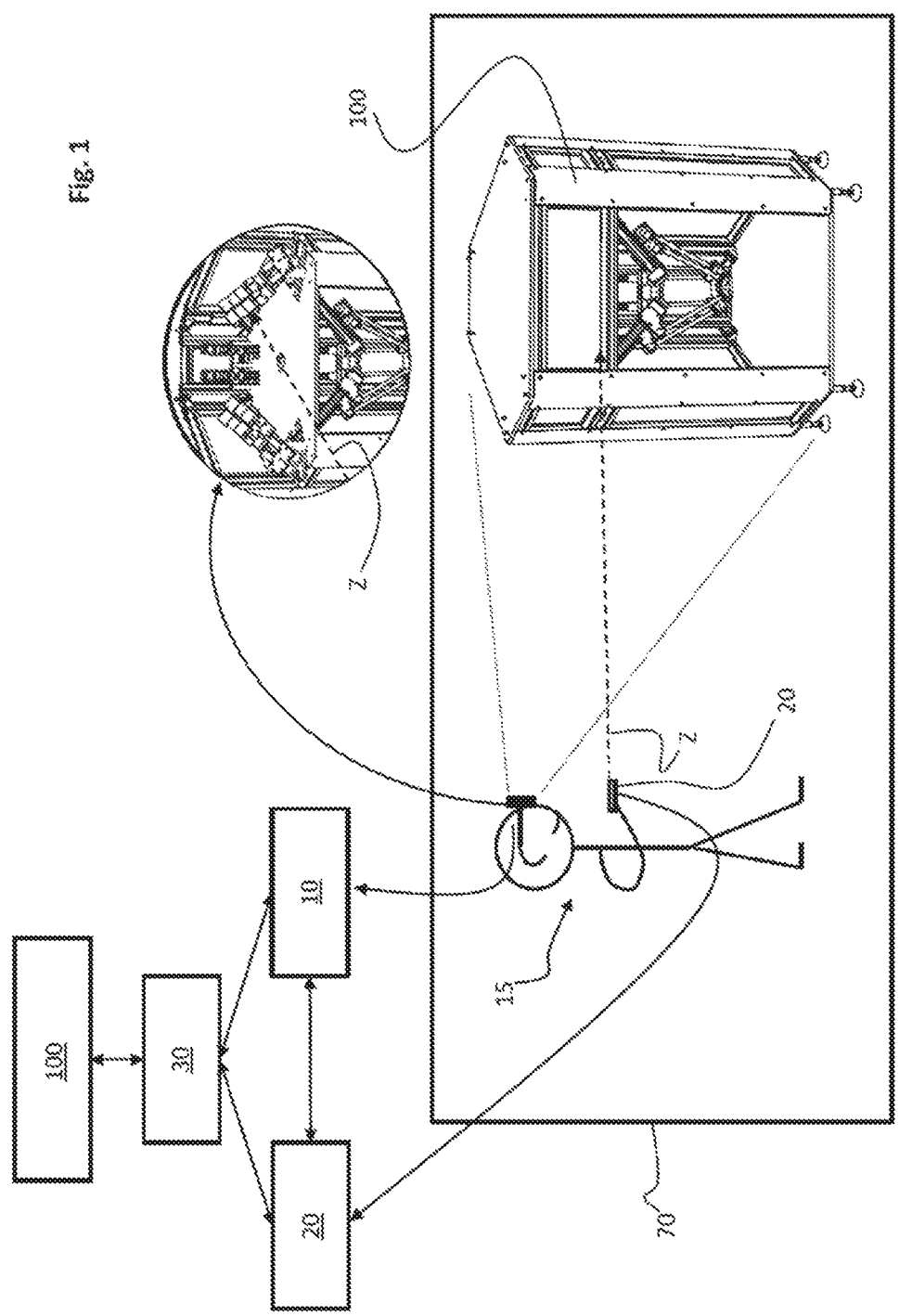

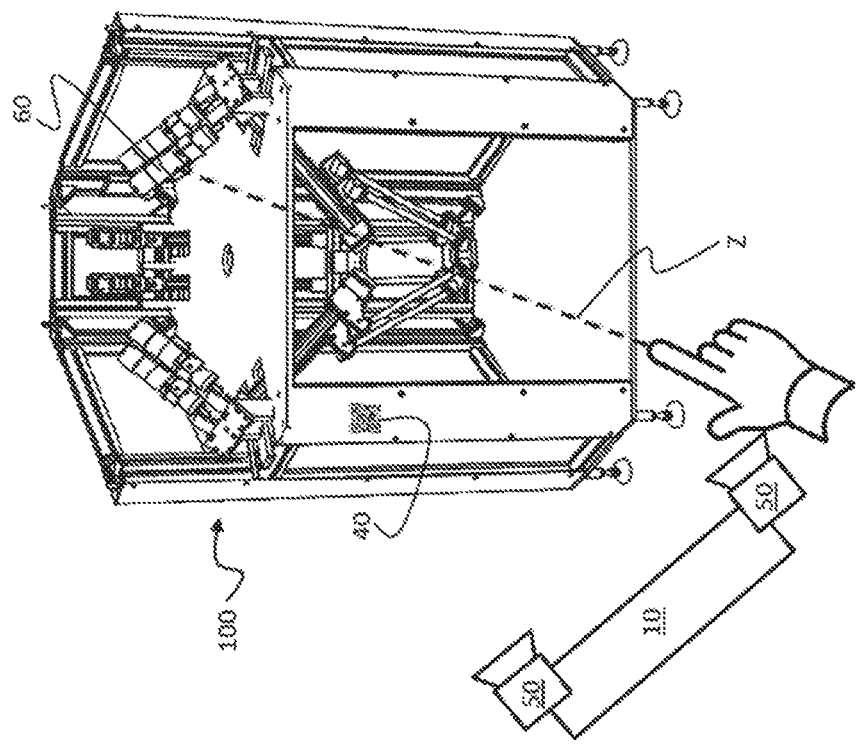
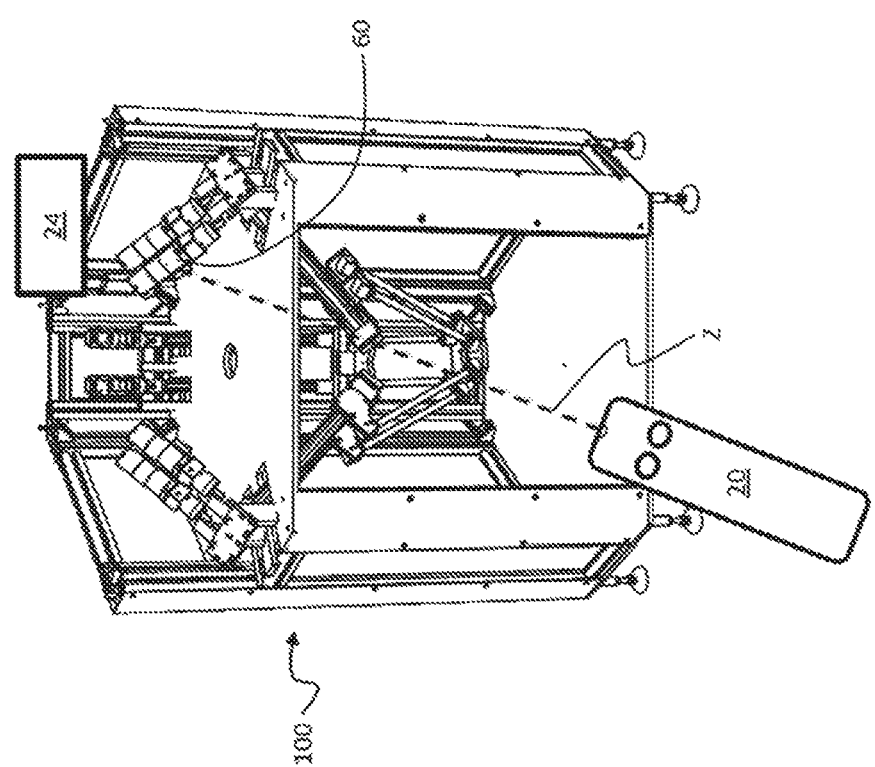

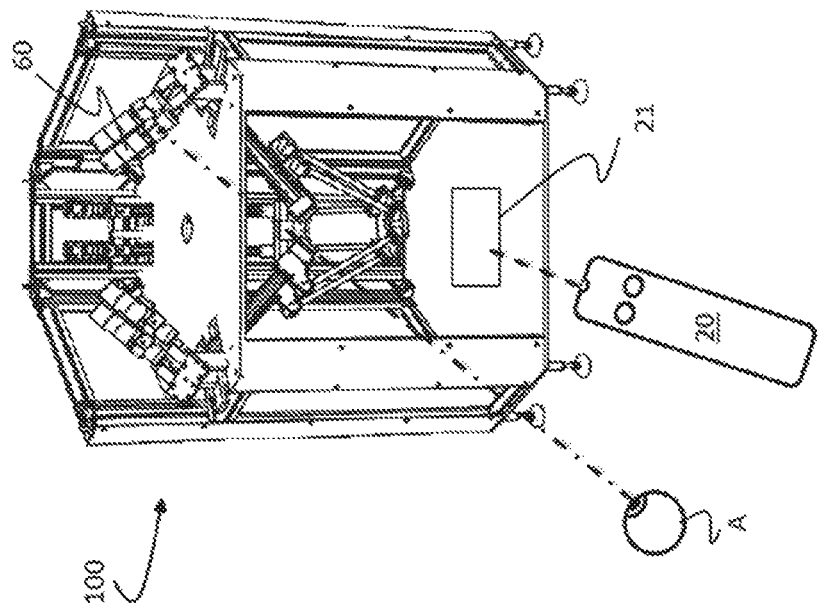
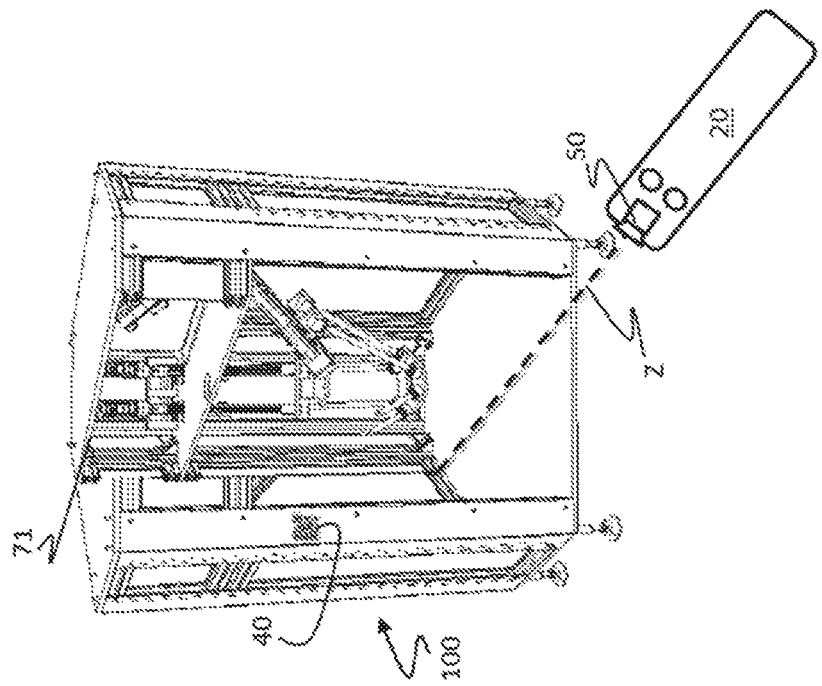

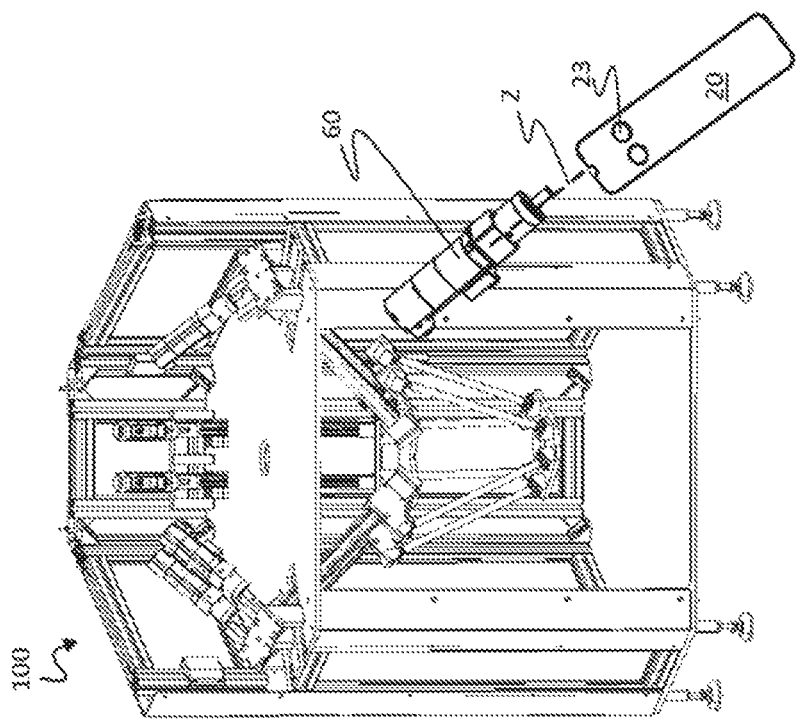
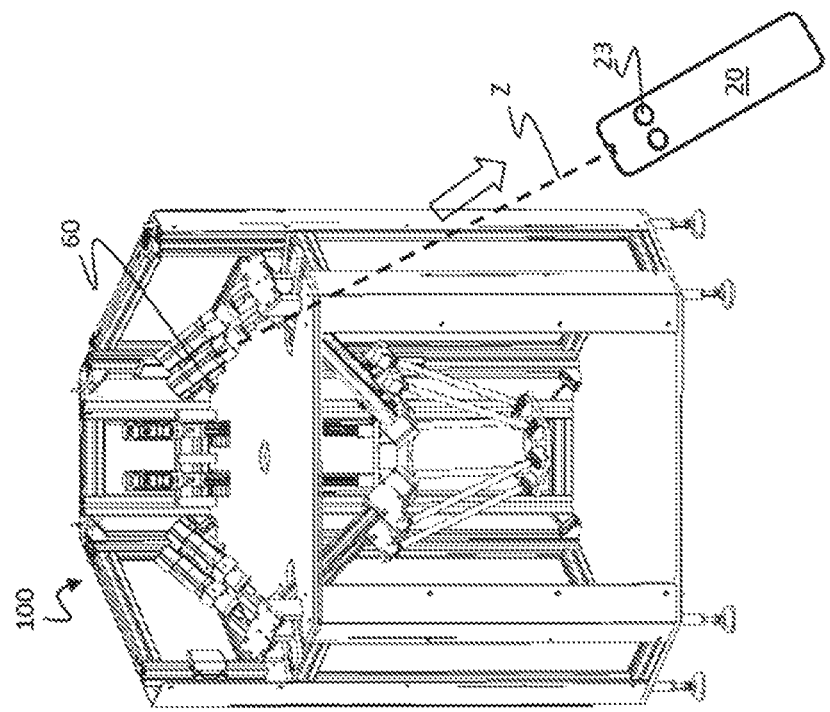

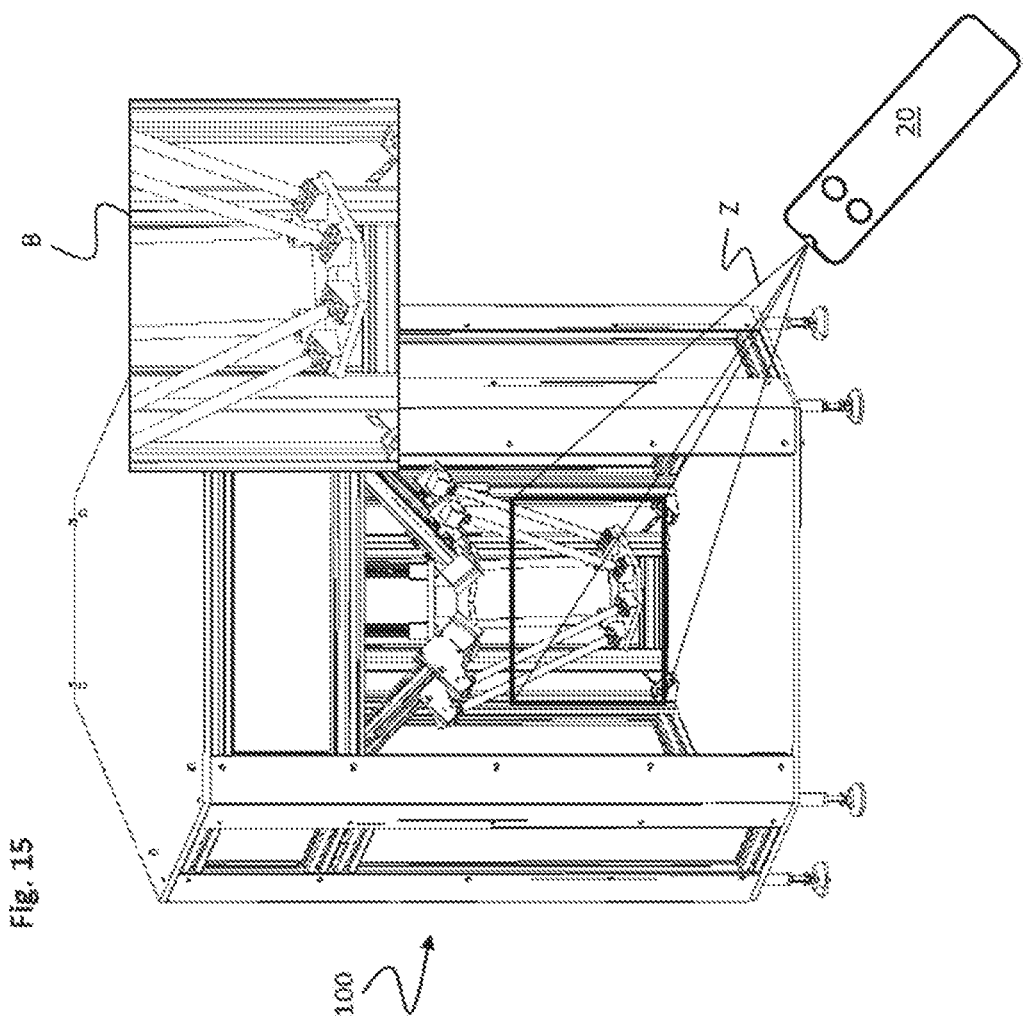

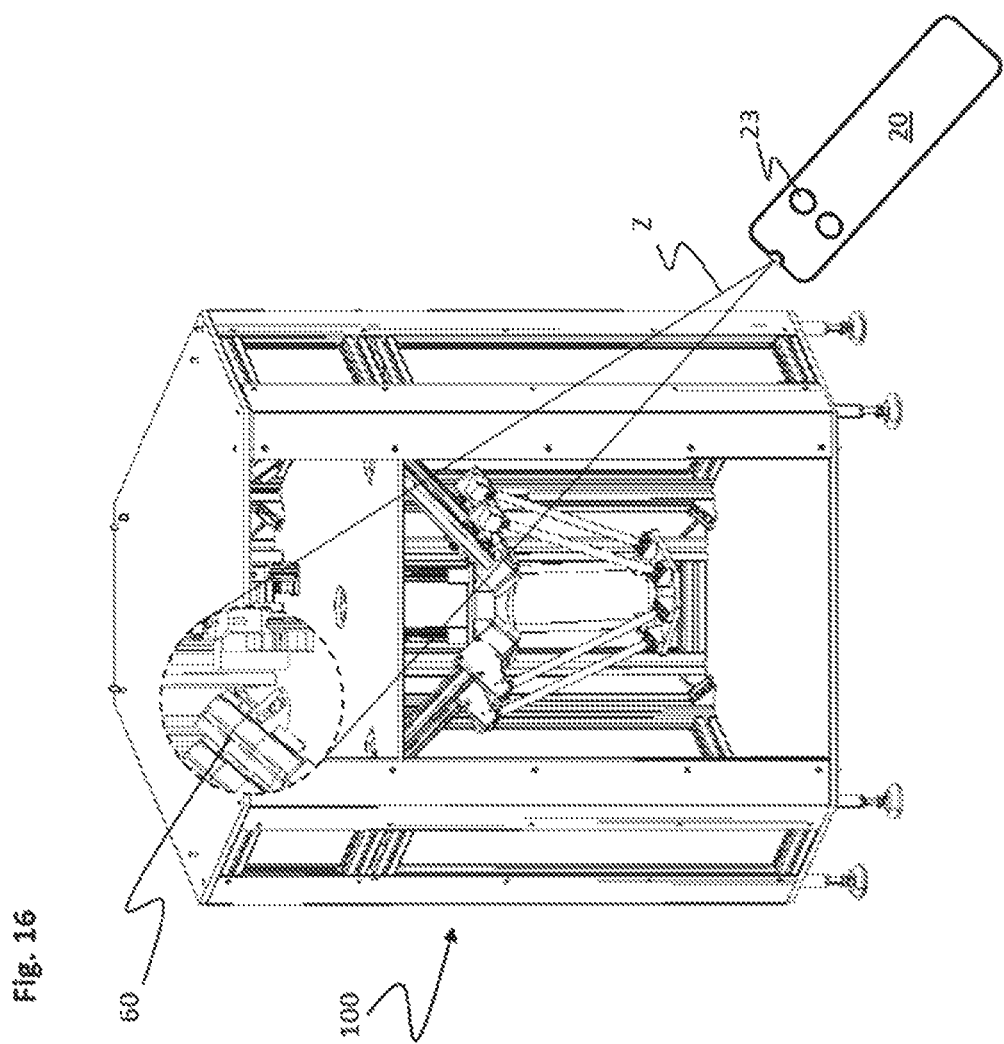

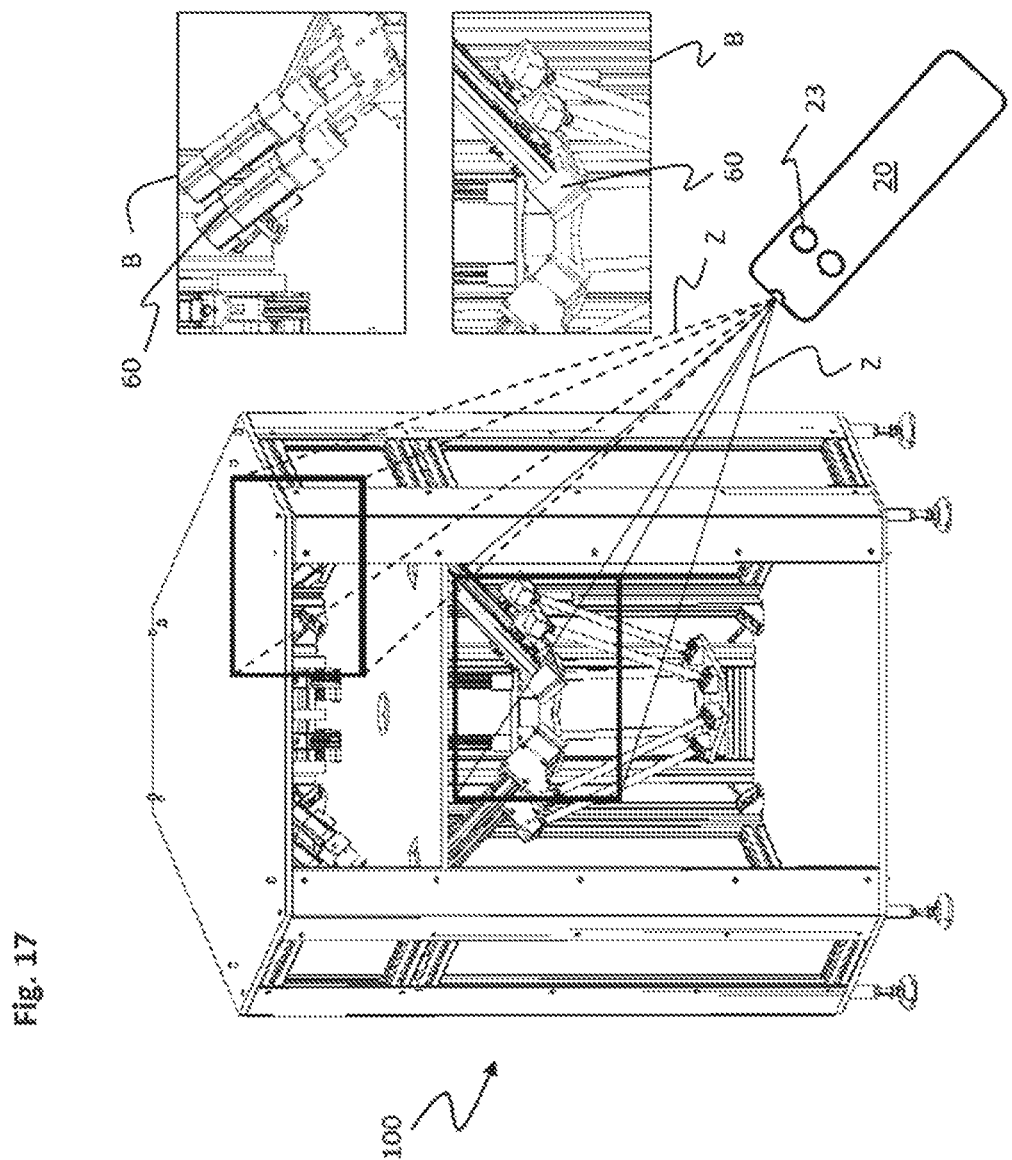

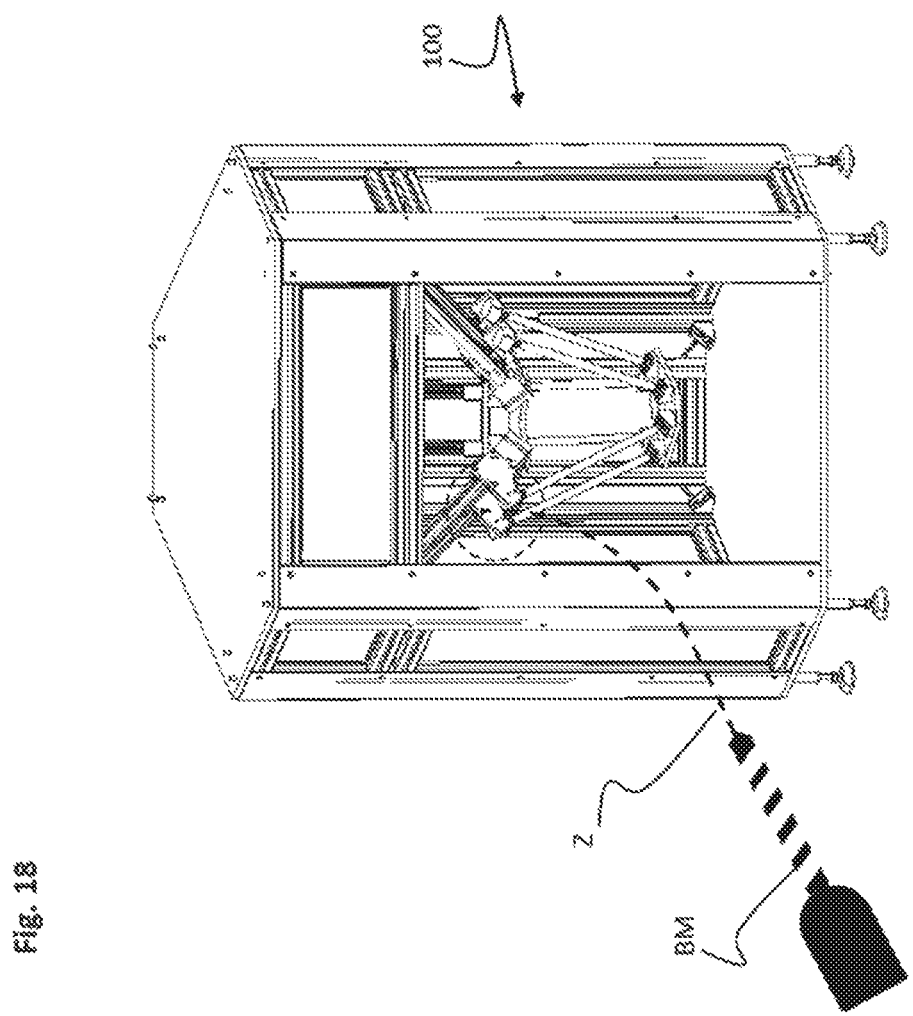

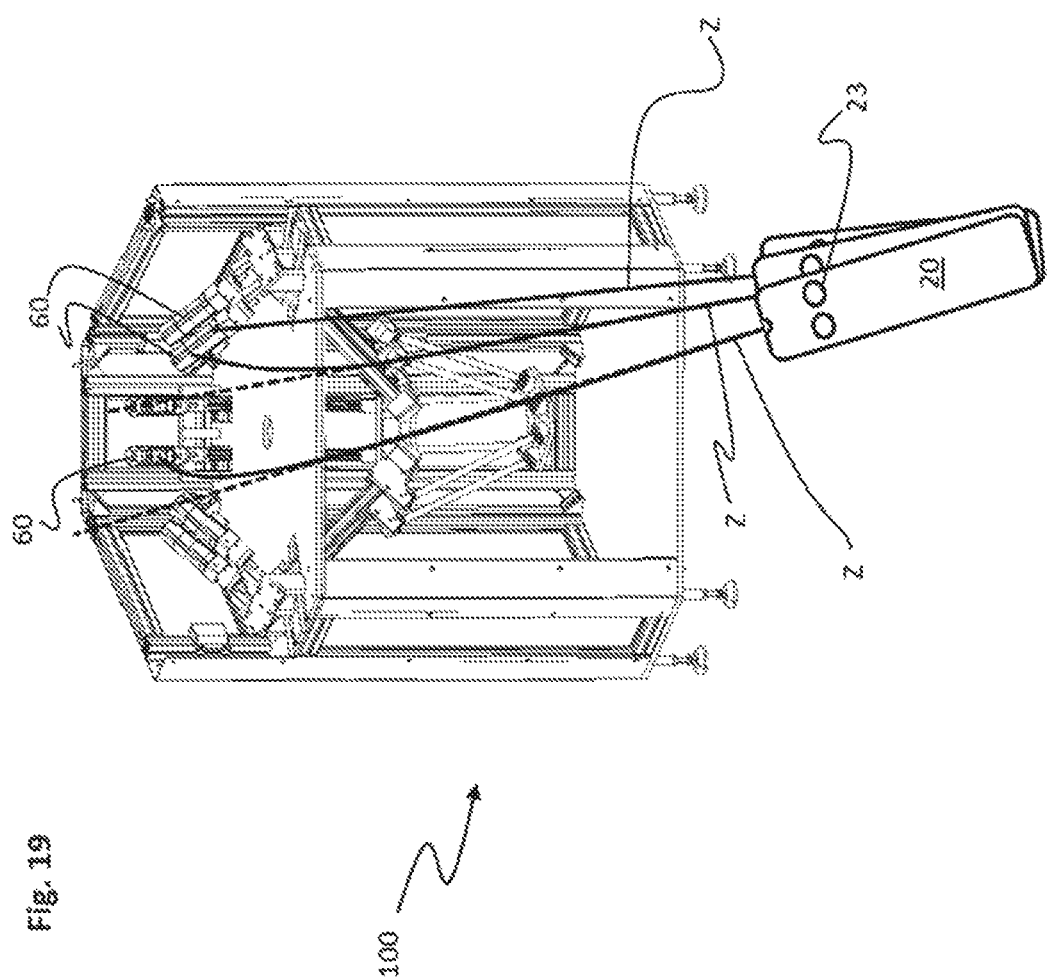

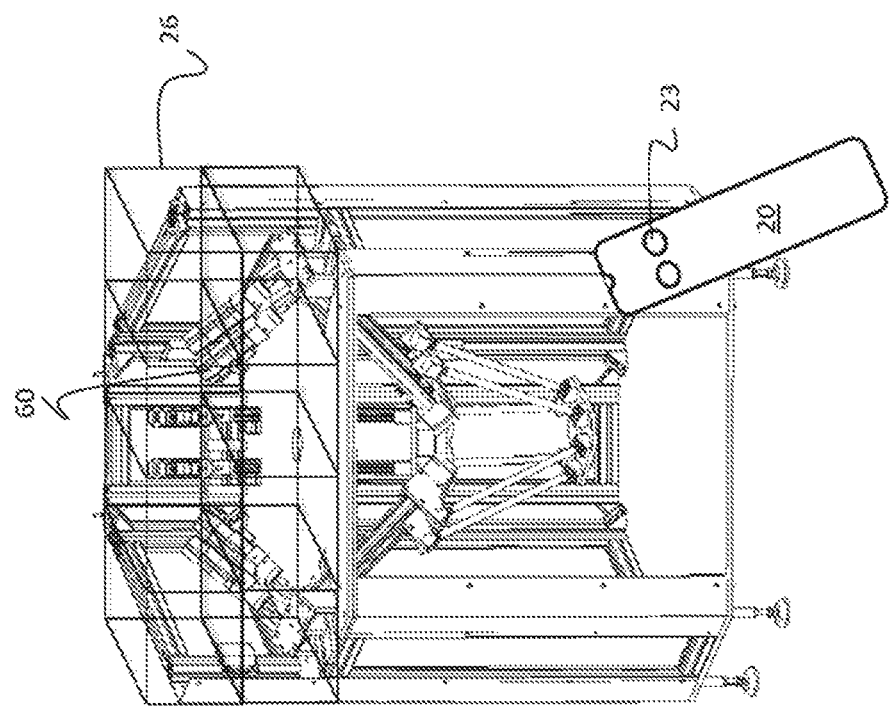

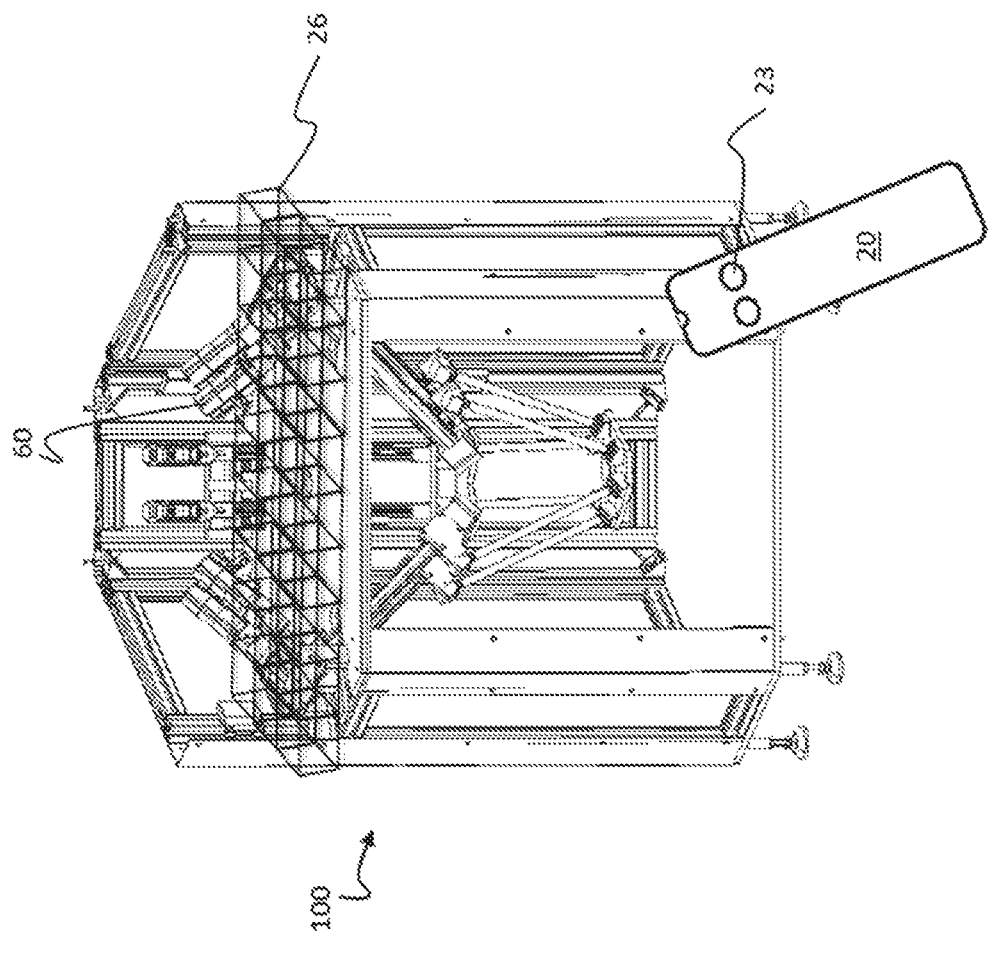

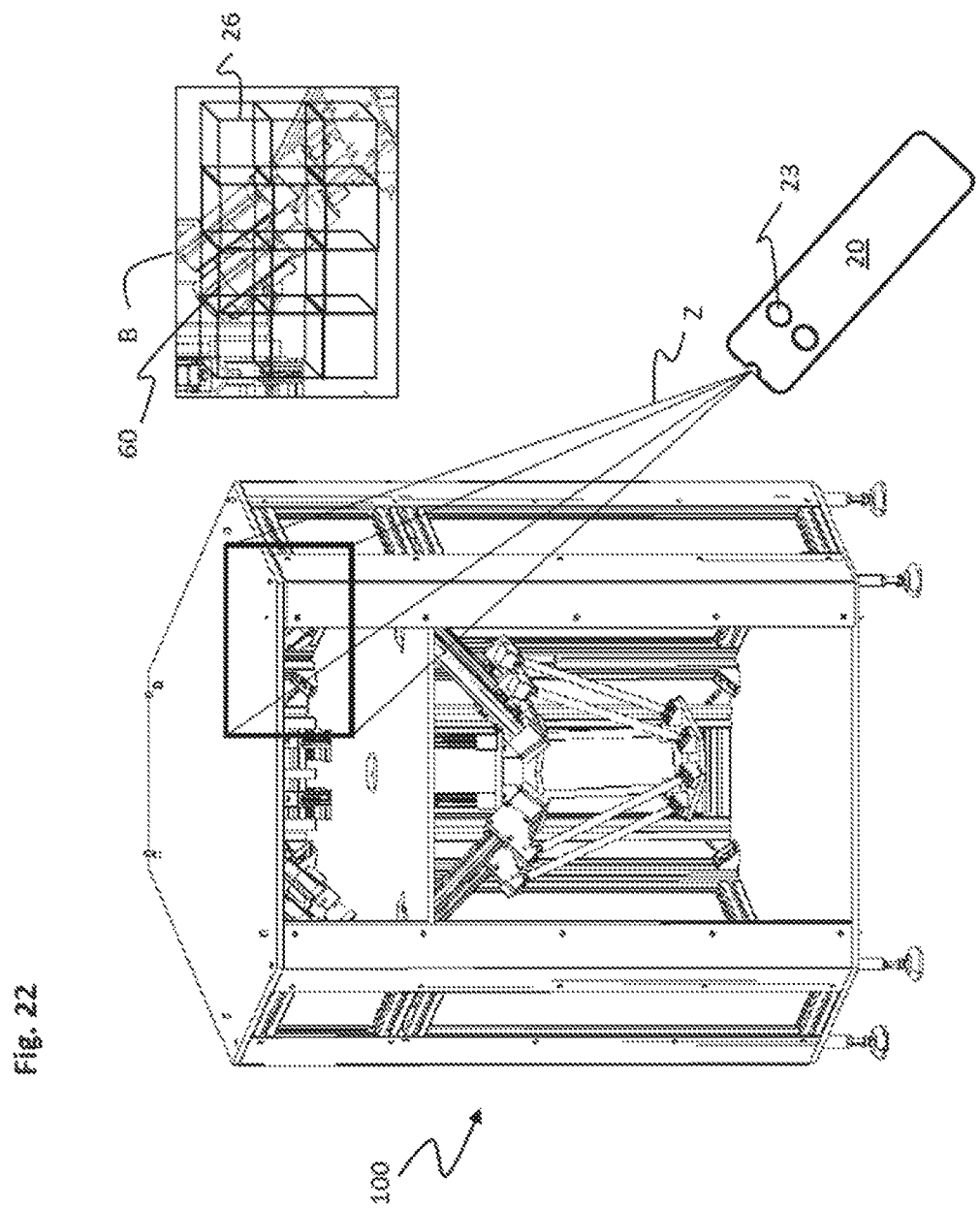

METHOD FOR CONTROLLING AN OBJECT

CROSS-REFERENCE TO RELATED APPLICATION

This patent application claims the priority of the German patent application DE 10 2016 113 060.5, the disclosure content of which is hereby included by way of back-reference.

SUBJECT

The invention relates to a method for controlling an object. The invention additionally relates to a system for controlling an object.

BACKGROUND

Augmented reality (AR) is increasingly playing an ever greater role in future-oriented technologies. Particularly for work on assembly lines or in 3D modeling of components, the combination of real environment and associated virtual objects is enjoying ever greater popularity. To cope with this trend, a large number of known enterprises, such as Microsoft, Oculus, Samsung and others, for example, are concerned with the development of depiction equipment required for this purpose.

All known systems for generating augmented reality are concerned with the interaction of virtual objects that are placed in a map of the real space and displayed on the depiction device.

WO 2009/132920 A1 discloses that virtual objects are linked to really existent objects with the aid of a controller by means of the mapping of said really existent objects in the character space. Whether or not the virtual object is in front of the real object in this case is of no concern. Said document further discloses operator control options that allow intuitive operator control of virtual objects in the character space by means of a pointer. On the one hand, this pointer may be of purely virtual nature; on the other hand, such a pointer can also be captured by means of sensors in the real space and transferred into the virtual character space. A multiplicity of different characteristics and manifestations that such a pointer may have or assume are disclosed. In addition, variants of gesture controls, the operator control of multiple objects and a multiplicity of techniques for pointer generation are proposed.

WO 2009/132920 A1 further discloses that pointers in the character space can assume different properties and geometric forms. Accordingly, these can also be shown in a depiction device.

WO 2009/1322920 A1 primarily teaches generation of pointers by means of MEMS sensors, as are known from acceleration sensors, magnetometers and conventional position detection systems, for example.

SUMMARY

The invention provides an improved method for controlling an object. Furthermore, the invention provides an improved system for controlling an object.

EXAMPLES

According to a first aspect, the object is achieved by means of a method for controlling an object,
wherein the object is arranged in the real space and is linked to at least one element of a character space,
wherein the object, a depiction device, an operator control device and a control device are functionally connected to one another,
having the steps of:
ascertaining a position and an orientation of the operator control device and/or of the depiction device in relation to the object,
generating a virtual pointer from the ascertained position and the ascertained orientation of the operator control device and/or of the depiction device,
selecting the object by means of the virtual pointer,
depicting the object, augmented with the at least one element of the character space, by means of the depiction device, and/or
controlling the object by means of the operator control device.

This allows navigation within an object and operator control of the object by means of a virtual pointer with a depth effect. The pointer with a depth effect can selectively call up the object, and the control device can be used to selectively cause control effects for the object.

According to a second aspect, the object is achieved by means of a system for controlling an object,
wherein the object is arranged in the real space and is linked to at least one element of a character space,
wherein the object, a depiction device, an operator control device and/or a control device are functionally connected to one another,
wherein the system is configured to ascertain a position and an orientation of the operator control device and/or of the depiction device in relation to the object,
wherein the system is configured to generate a virtual pointer from the ascertained position and the ascertained orientation of the operator control device and/or of the depiction device,
wherein the system is configured to select the object by means of the virtual pointer,
wherein the system is configured to depict the object, augmented with the at least one element of the character space, by means of the depiction device, and
wherein the system is configured to control the object by means of the operator control device.

Preferred embodiments of the method are obtained from the respective dependent claims.

One advantageous development of the method provides for the at least one virtual element of the character space to be controlled by means of the control device. This allows selective control operations to be performed on the object.

A further embodiment of the method is distinguished in that at least two of the elements: depiction device, operator control device, control device are wirelessly connected to one another. This gives rise to particularly the technical advantage that conventional wireless methods can be used in order to provide a wireless communication between the cited elements, for example in the form of WLAN, Bluetooth, ZigBee, Z-Wave, EnOcean, etc.

A further embodiment of the method is wherein the operator control device is configured as a passive element. This advantageously allows virtual pointers to be generated even with very simple objects without a communication interface.

A further embodiment of the method is wherein the operator control device is configured as an intelligent sensor and decision-making device of an autonomous machine.

This advantageously allows an autonomous machine to simulate and rate its interaction with another controller in advance.

A further embodiment of the method provides for the depiction device used to be one from the following: data goggles, data lens, tablet, television set, projector, mobile phone, smartwatch, panel PC, industrial PC, monitor. This advantageously allows different technical devices to be used as depiction device.

A further embodiment of the method provides for the virtual pointer to have one of the following forms: cone, fan, lasso, beam, fishing rod with a 3D shape as a hook. This advantageously allows different regions of the object to be called up depending on the requirement. A selective control option for the object is advantageously supported in this manner.

A further embodiment of the method provides for the virtual pointer to be changed in line with a parameter of the real space. In this manner, it is advantageously possible to selectively configure a control characteristic of the object.

A further embodiment of the method is wherein the virtual elements of the character space are used to change parameters of the object. This advantageously allows the object to be controlled in different manners depending on the requirement.

A further embodiment of the method is distinguished in that the object is selected by using at least one augmented reality marking element. In this manner, the object has better selectability, as a result of which there is e.g. a better possibility of identifying at what points or over which components of the object an augmented reality is meant to be superimposed.

A further embodiment of the method provides for the position and the orientation of the operator control device to be ascertained by using a camera. This easily allows exact ascertainment of the position and the orientation of the operator control device and hence precise generation of the virtual pointer.

A further advantageous embodiment of the method provides for the object to be selected by means of the virtual pointer by performing a scan of the object. In this manner, selection of the object by means of the operator control device can be performed even more easily.

A further advantageous embodiment of the method provides for at least one virtual component of the object to be able to have its virtual location altered. This supports better visualization of individual components of the object. In particular, it allows individual virtual components not to be concealed by other virtual components. A better analysis capability for or possibility of interaction with the object is supported thereby.

A further embodiment of the method provides for the operator control device to be used in a manner arranged in the depiction device. This allows an outlay on technical operator control elements to be advantageously kept down.

A further advantageous embodiment of the method is wherein the object is controlled by means of at least one additional remotely arranged virtual pointer. This advantageously allows the object to be controlled remotely, so that control of the object is advantageously possible by multiple users in different places at the same time.

A further embodiment of the method provides for at least one virtual pointer to be used that arises from a virtually augmented object or a real object. In this manner, the virtual pointer is not necessarily tied to a physical presence of an operator control device.

A further embodiment of the method provides for at least part of the method to be carried out in a cloud-based manner. This advantageously allows a computation power and/or memory requirement to be relocated to a central cloud, which allows local computer devices to be relived of load.

A further embodiment of the method is wherein virtual elements of the character space are used to create a computer program for the object. This allows e.g. programs for production machines of automation systems to be created by means of graphical software development tools.

Further advantageous embodiments of the method are obtained from further dependent claims.

In an advantageous manner, the method according to the invention allows control of the object or interaction with the object by means of a virtual pointer or the generating pointer object thereof.

BRIEF DESCRIPTION OF THE DRAWINGS

The properties, features and advantages of this invention that are described above and also the way in which these are achieved will become clearer and more distinctly prehensible in conjunction with the description that follows for the exemplary embodiments that are explained in more detail in conjunction with the drawings.

FIG. 1 shows an overview of a system according to the invention;

FIG. 2 shows an object selection by means of a virtual pointer from the perspective of a depiction device;

FIG. 3 shows an example of the generation of a virtual pointer with a passive element;

FIG. 6 shows a basic depiction of pointer generation by means of a camera system in the operator control device and a marking element physically mounted on the object;

FIG. 7 shows an example of generation of a virtual pointer by means of eye tracking;

FIGS. 13 and 14 show exemplary virtual zooming-in on a virtual component of the object;

FIG. 15 shows exemplary zooming-in on a real detail of the object;

FIG. 16 shows exemplary x-beaming with direct showing of the x-beamed region in the depiction device;

FIG. 17 shows exemplary x-beaming with indirect showing of the x-beamed region in the depiction device;

FIG. 18 shows a fixed virtual pointer for the purpose of autoguiding;

FIG. 19 shows selection of virtual components of the object by means of a kind of "magnet functionality";

FIGS. 20 and 21 show an example of selection of virtual components of the object by virtual scanning of the object;

FIG. 22 shows an example of a scan of the object by cubes with a virtual display;

DETAILED DESCRIPTION

Figure 5:
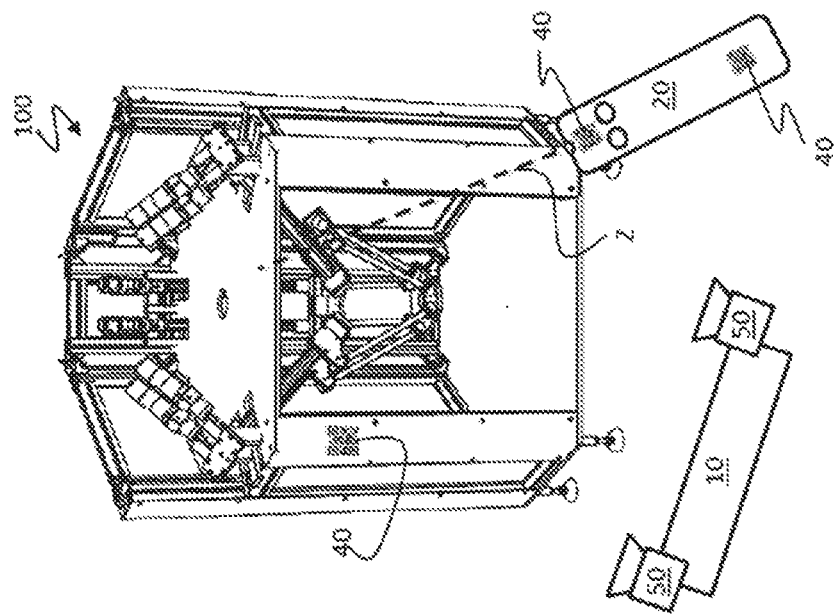
FIG. 5 shows a basic depiction of capture of form and location parameters of the operator control device by means of augmented reality marking elements and a camera system arranged in the depiction device.

The invention has been illustrated and described in more detail on the basis of the preferred exemplary embodiments. Nevertheless, the invention is not limited to the disclosed examples. Rather, other variations can be derived therefrom by a person skilled in the art without departing from the scope of protection of the invention.

The wordings "or, respectively" and "or" used below particularly also comprise the wording "and/or".

Operator control, control and navigation through virtual and semivirtual spaces that are connected by a control device to a machine/installation/building/stage or other environment inside or outside buildings and parts of a machine/installation/building/stage or other environment inside or outside buildings (objects) is facilitated or made more intuitive. To this end, an operator control or depiction device is subsequently used in relation to the object, the operator control or depiction device defining, by virtue of its known locations or positions and orientations in the real space, a virtual pointer object or a virtual pointer. In this manner, a kind of interface between a human being or autonomous machine and a region of augmented reality is provided (human augmented reality interface HARI).

Methods are known that can be used to integrate a virtual space (character space) into a real space (real space) relative to a depiction device. In the simplest manner, this is made possible by a camera of the depiction device and augmented reality marking elements (AR markers) that are mounted in the real space. In this regard, the camera captures the location and position of the augmented reality marking element. Subsequently, the character space behind, in front of or around the marking element is set up and, in case of augmented reality, is depicted in a manner superimposed on the real map of the space.

The character space can contain a 3D model (or details therefrom) of a machine/installation/building/stage or the like, for example. There is now the possibility, as already described in WO 2009/132920 A1, of connecting really existent objects to virtual maps in the character space by means of a control unit. If there is now an interaction with the virtual space, then the respective real objects and any virtual augmentations thereof react in an appropriate manner.

Besides the methods for generating virtual pointers that are disclosed in WO 2009/132920 A1, such generation is also possible using the methods described at the outset. If the virtual pointer in the character space is known, then said character space can be visualized in different forms in the depiction device (e.g. in the form of goggles, a data lens, a tablet, a smartphone, a television set, a projector, a smartwatch, etc.). Some of these forms are already known from WO 2009/132920 A1. In the simplest manner, this virtual pointer is configured as a beam or a cone having constant, defined dimensions or having variable, dynamic dimensions.

The mapping of the generated virtual pointer in the character space allows the orientation thereof in relative or absolute terms in relation to the objects situated in the character space to be inferred. If the virtual pointer is oriented to an object in the character space, then said object can be selected and interacted with. The linking of the virtual maps to the real objects by means of the control device, as described in WO 2009/132920 A1, additionally allows the control and operator control signals to be forwarded directly to the really existent object. By way of example, it is possible in this context to think of a linear motor, the moving part of which is selected and virtually displaced, this movement being implemented in the real environment at the same time.

Furthermore, it is also conceivable that, although a virtual object is physically not existent, it is nevertheless linked to a real object via the control unit. A simple example that could be cited in this context is a virtual switch that is shown in the character space or in the augmented reality space (AR space). If this switch is selected and operated by means of the virtual pointer, the really existent illumination device of the space is switched on or off.

It is also conceivable to produce a virtual pointer object with the aid of an image-producing system, e.g. camera, radar, etc., that is arranged in the space or in an operator control device (e.g. video goggles, semitransparent video goggles, hand-held operator control device, etc.).

Video goggles or other depiction devices that are designed for use in the field of augmented reality normally already have a camera system for the purpose of capturing the real space. These systems can additionally be used to capture a physically existent item for generating the virtual pointer. In the simplest manner, the orientation and the position of one or more fingers of the user could be captured and adopted in the character space as an orientation and origin of the virtual pointer. As direct feedback, it is conceivable in this context for the virtual pointer generated in this manner to be shown in the depiction device.

FIG. 1 shows a fundamental operating principle for the proposed method for controlling an object in due consideration of augmented reality. In a real space 70 with a really existent, controllable object 100, there is a user 15 who uses a depiction device 10, e.g. in the form of data goggles. An operator control device 20 that the user 15 holds is used to form a virtual pointer Z that points to the controllable object 100, for example in the form of a training robot. The depiction device 10 and/or the operator control device may be e.g. configured as sensors of an autonomous apparatus. In this manner, a kind of cross-communication is realized between two autonomous apparatuses in a kind of simulation mode.

A length and an orientation of the virtual pointer Z are ascertained on the basis of known mathematical methods, this being used to ascertain the position at which the virtual pointer Z "intersects" the object 100. Ultimately, the virtual pointer Z thus realizes a kind of "depth effect" that enables it to select the spaced really existent object 100.

By means of the depiction device 10, the user 15 sees the oval detail depicted in FIG. 1, the virtual pointer Z being shown in the field of vision. It can be seen that the depiction device 10 and the operator control device 20 are functionally connected to a control device 30 that controls the object 100 in line with a control command from the user 15 that is delivered to the operator control device 20.

A crucial aspect is that the operator control device 20 is used to orient the virtual pointer Z correctly to the object 100. On the basis of the location and the orientation of the operator control device 20 in relation to the object 100, the control device 30 can generate the virtual pointer Z. On the basis of the configuration of the virtual pointer Z, the control device 30 can now perform the control of the object 100. As a result, the virtual pointer Z is used to provide the user 15 with the convenient possibility of controlling the real object 100 via the control device.

The depiction device 10, operator control device 20 and the control device 30 are preferably functionally connected to one another via an electrical line. Alternatively, it is also possible for at least two of the cited elements to be connected to one another wirelessly, however.

FIG. 2 shows a basic option for generating the virtual pointer Z. It is possible to see the operator control device 20, the orientation and positioning of which in the real space 70 depicted in FIG. 1, for example, is captured, as a result of which the virtual pointer Z is formed, which in this case points to a virtual component 60 of the object 100. The virtual component 60 is an electric motor, for example, with a virtual element or object in the form of a display 24 being shown in the depiction device 10. On the display 24, it is possible to display a temperature or a speed of the electric motor, for example. In this manner, augmented reality can be used to advantageously visualize for the user real data from a really existent electric motor that is depicted as virtual component 60 in the depiction device 10.

FIG. 3 shows a similar scenario to FIG. 2, in this case the virtual pointer Z being produced with the aid of a schematically depicted finger of the user, the location and position of which in the space is captured by means of two cameras 50 arranged in the depiction device 10. Alternatively, the pointer-generating element used can also be another passive element, such as a pointing stick without a communication interface, for example. Ultimately, this also allows the virtual pointer Z to "intersect" the virtual component 60 and, as a result, functional control of the virtual component 60 by means of the control device 30 (not depicted).

Figure 4:
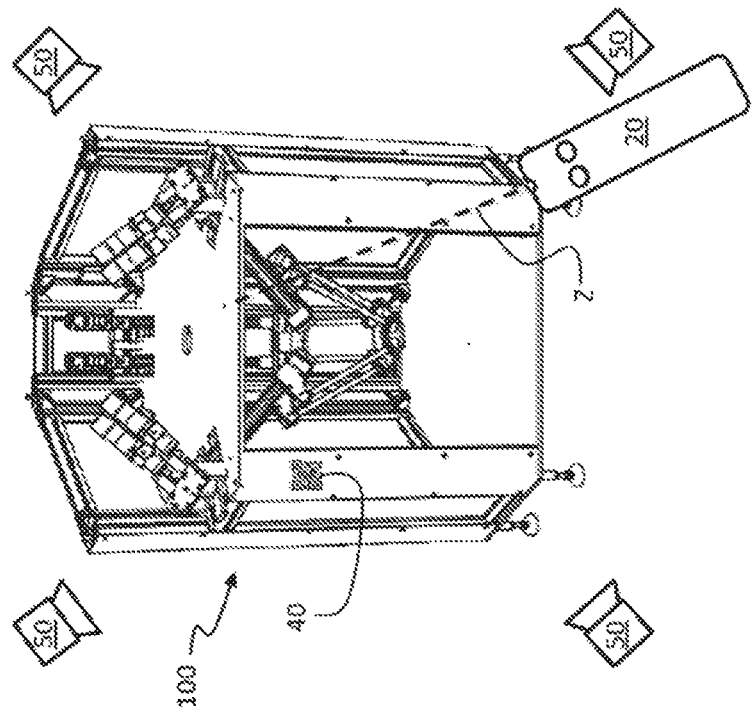
FIG. 4 shows a basic depiction of capture of form and location parameters of the operator control device with an external camera system.

To capture the position and orientation of the object for pointer generation, a camera system mounted in the space is also conceivable. FIG. 4 shows such a configuration with cameras 50 arranged symbolically in four corner regions of the space. It is further possible to see an augmented reality marking element 40 that can be used in order to improve capture of the position and orientation of the operator control device 20 in relation to the object 100 still further.

From FIG. 5, it can be seen that such augmented reality marking elements 40 may also be arranged on the operator control device 20. In this manner, the position and orientation of the operator control device 20 in the space relative to the object 100 can be ascertained better still. For this purpose, the marking elements 40 can be recorded by the two cameras 50 of the depiction device 10 or by one camera 50 in the real space (not depicted), position and location parameters being captured and transmitted into the character space. A camera may conventionally be a photographic or video camera. However, sensors suitable e.g. for underwater or night shots and delivering a map of the environment, such as sonar or radar sensors, for example, would also be entirely conceivable.

Besides the cited options for generating the virtual pointer Z, an operator control device 20 having a built-in camera system is also conceivable. Augmented reality marking elements 40 that are mounted in the real space 70, or other anchor points, can be used to ascertain the location and orientation of the operator control device 20 easily by virtue of known methods. To this end, it is additionally possible to use the already existent marking elements 40 for the depiction device 10.

FIG. 6 shows pointer generation by means of a camera 50, arranged in the operator control device 20, and an augmented reality marking element 40, which is physically mounted on the object 100. In FIG. 6, it is further possible to see a 3D model 71 superimposed on the real space 70 from the perspective of the depiction device 10, e.g. in the form of semitransparent video goggles. Hence, the method according to the invention or the system allows the user to use the depiction device 10 to depict more or less any sections of the object 100, as a result of which he can identify possible sources of danger for the object 100 to be controlled and/or for workpieces to be machined by means of the object 100, for example.

Methods are known that can be used to capture an orientation of human eyes, i.e. a line of vision (eye tracking). These data can be used alone or in combination with position data for the purpose of generating the virtual pointer Z.

FIG. 7 shows such a scenario with a symbolized human eye A that is focused on a virtual component 60 of the object 100. The line of vision of the eye A is ascertained by means of appropriately known units and technologies and is used for identifying the virtual component 60, as a result of which ultimately a virtual pointer Z is generated together with the operator control device 20. Following selection of the virtual component 60 of the object 100 using the virtual pointer Z, a menu 21 displayed in the depiction device 10 opens, said menu being able to be used to make settings on the virtual component 60. It would also be conceivable to use captured specific eye movements (e.g. blinking, winking, eye rolling, etc.) to perform specific actions relating to the virtual component 60.

A further option for virtual pointer generation is based on direct use of the location and position parameters of the depiction device 10.

Figure 8:
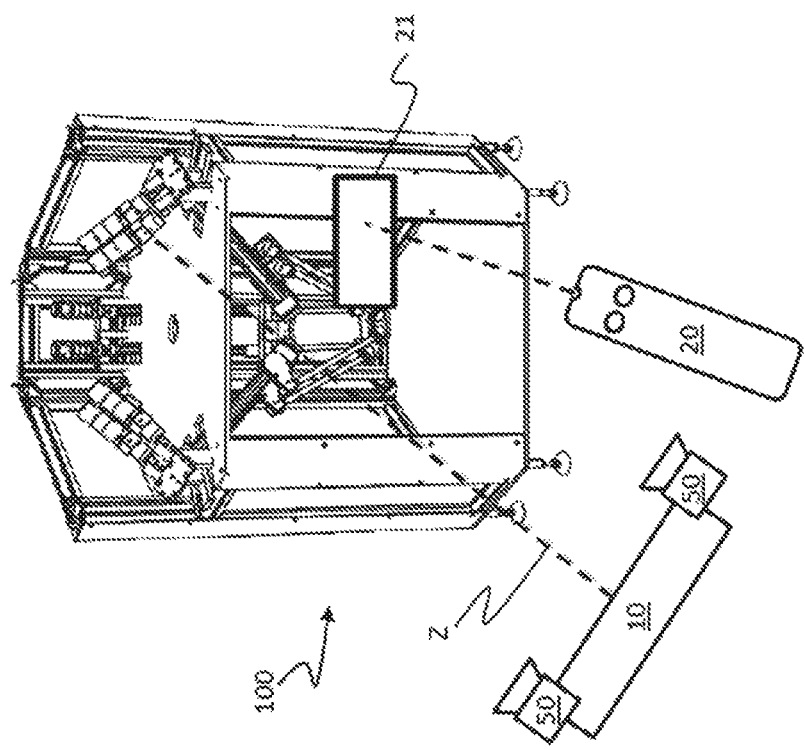
FIG. 8 shows an example of pointer generation by means of capture of position and location parameters of the depiction device.

FIG. 8 shows such a configuration with an operator control device 20 and a depiction device 10, the location and position parameters of which are captured with two cameras 50, as a result of which the origin of the virtual pointer Z arises from a central region of the depiction device 10. The operator control device 20 points to a menu 21, depicted in the depiction device 10, with operator control elements that can be used to operate elements of the apparatus 100. In this manner, the origin of the pointer Z is "fixed" in the center of the depiction device 10. In this context, pointer generation is also possible by means of depiction devices that have a fixing in the space or whose positions can be altered exclusively on stipulated paths (not depicted).

Figure 9:
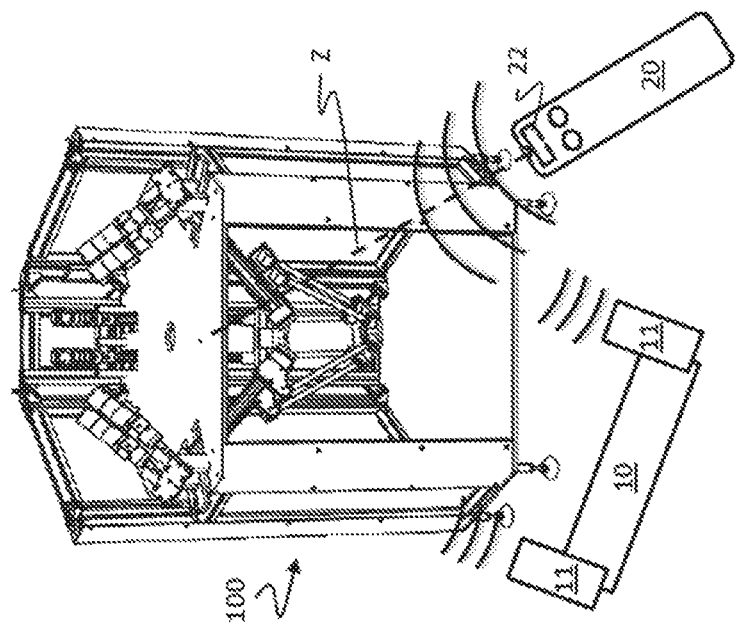
FIG. 9 shows an example of generation of a virtual pointer by additional sensors on the operator control device.

A further option for generating the virtual pointer Z consists, as depicted in simplified fashion in FIG. 9, in combined use of the depiction device 10 with the operator control device 20. By way of example, for this purpose, the depiction device 10 in the form of video goggles may have multiple receivers 11 (e.g. ultrasonic receivers or other reception sensors) mounted on it. The operator control device 20 has a transmitter 22 associated with the receivers 11. Known methods (e.g. time of arrival, time difference of arrival, etc.) can in this manner be used to ascertain the position and location of the operator control device 20 relative to the object 100 by means of transmitted and received signals, and said position and location can subsequently be transmitted into the character space, with a virtual pointer Z being generated in the character space.

In FIG. 9, it is possible to see the operator control device 20 and the depiction device 10, a transmission signal originating from the transmitter 22 of the operator control device 20 being indicated that is received by the receiver 11 of the depiction device 10 and that can be used to ascertain a position and an orientation of the operator control device 20 relative to the depiction device 10. Ultimately, the virtual pointer Z pointing to the object 100 is generated in the character space in this manner.

In general, the introduction of an alterable virtual pointer Z in the character space results in different possible navigation and operator control options. Some designs and mechanisms suitable therefor are explained in more detail below.

Figure 10:
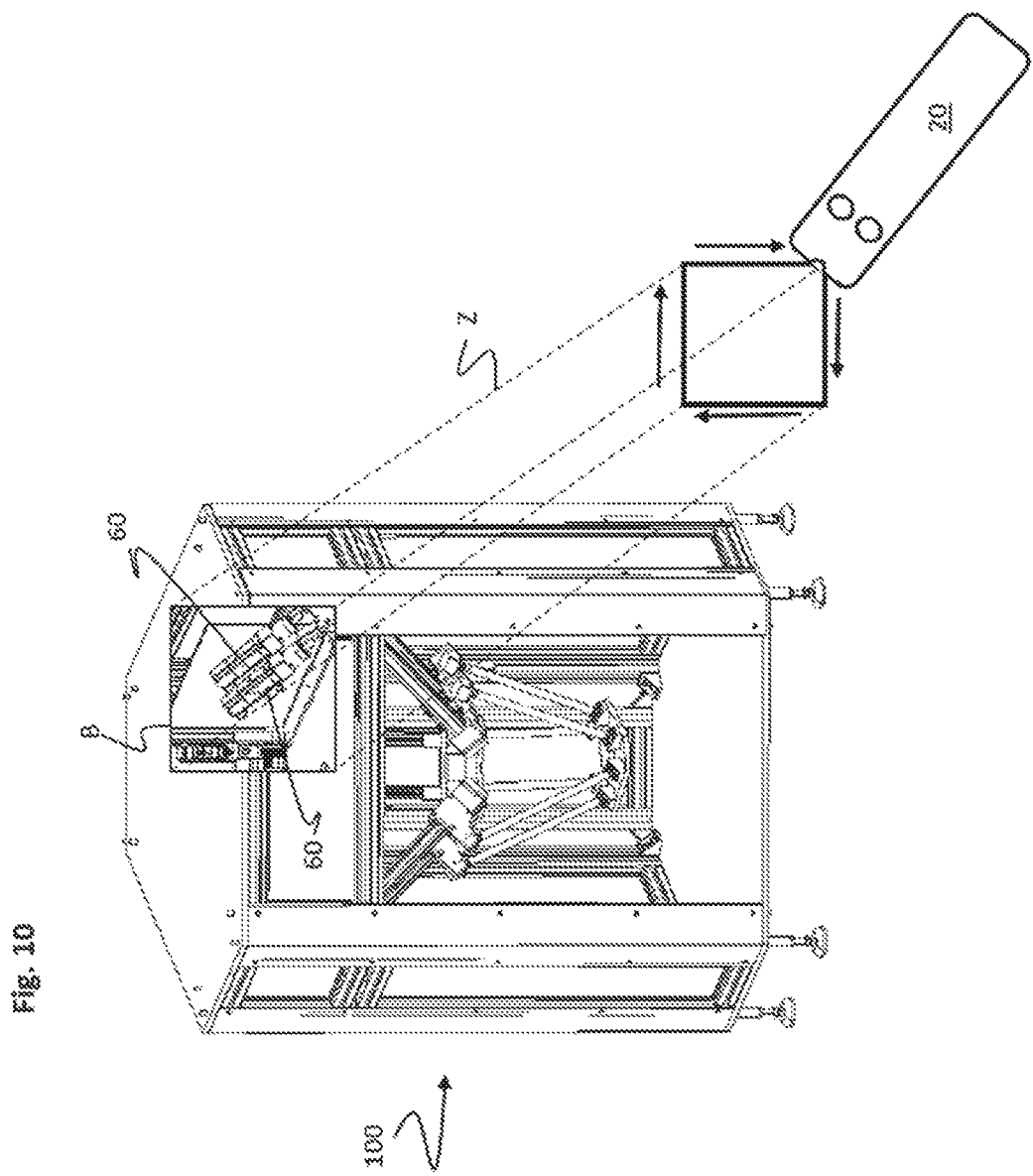
FIG. 10 shows exemplary cutting-out of a subregion of the object by means of pointer orientation and an active "Cut" function of the operator control device.

FIG. 10 shows one possible scenario. In the real space, character space or augmented reality space, there may be real or virtual objects that surround or conceal other objects. These visual boundaries can advantageously be lifted by means of a "cutting functionality" of the virtual pointer Z. In a simple manner, this is accomplished by "cutting out" a hole from a first layer of a virtual element of the object 100 by means of the virtual pointer Z with subsequent hiding of the cut-out hole in the depiction device 10. In this manner, objects or virtual components behind said hole are visualized and are therefore available for a further selection. It is also possible in this case to cut out lower layers or subregions of virtual elements of the objects.

In FIG. 10, it can be seen that the cited virtual cutting function of the virtual pointer Z is used to apparently "cut out" a layer of the object 100 in a defined virtual region B, as a result of which virtual components 60 of the object that are behind said layer are visualized for the user. A square region with four arrows that is arranged in front of the operator control device 20 is intended to indicate a motion sequence of the operator control device 20 that is used to cut out the virtual region B from the object 100.

Particularly in the case of objects 100 that have a complex internal structure, it may make sense to extract an explicit part or an explicit subregion from the actual object 100. In the simplest form, for this purpose, a virtual component 60 is marked and singled out with the aid of the virtual pointer Z and is subsequently positioned in the character space in a released fashion. Ultimately, a kind of exploded-view drawing of the virtual component 60 can be produced in this manner. Subsequently, the virtual component 60, singled out in this manner, of the object 100 is available for further selection or handling.

Figure 11:
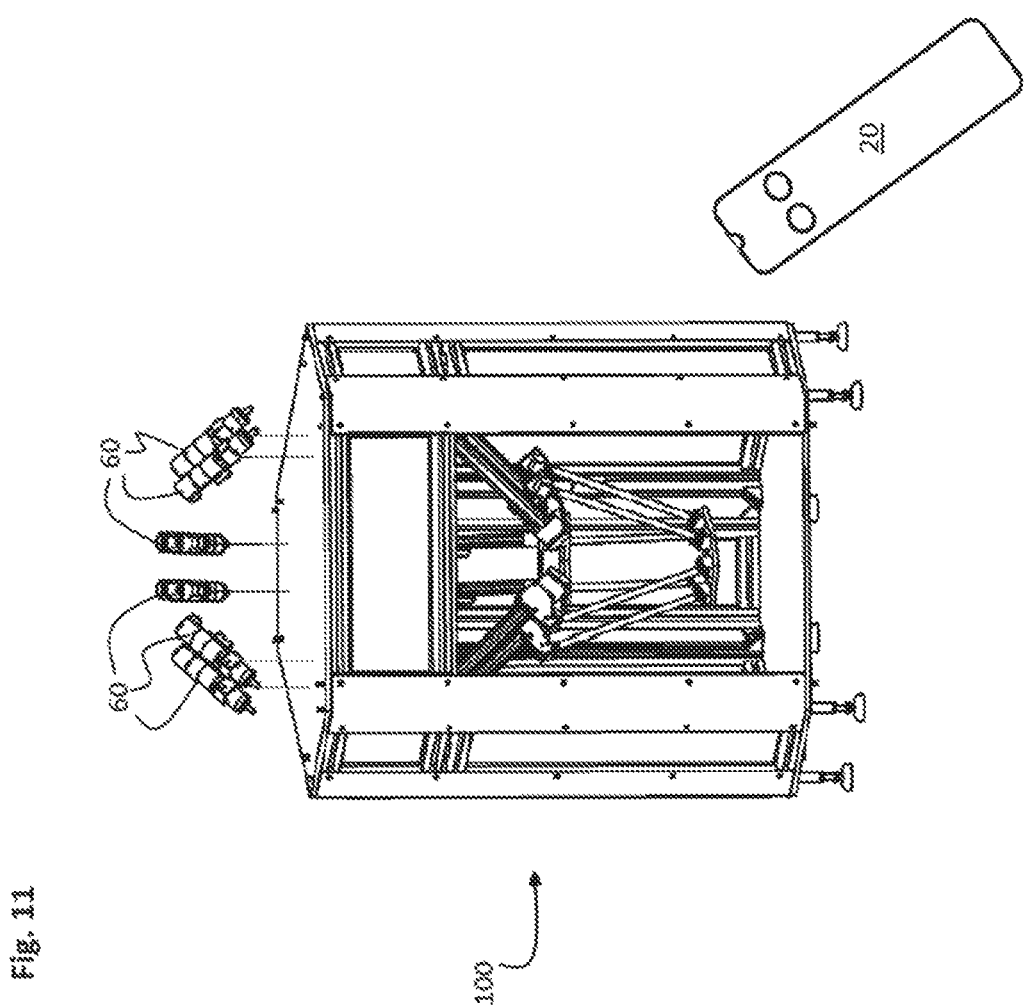
FIG. 11 shows exemplary virtual extraction of virtual object elements or components of the object.

FIG. 11 shows such a design for extraction of virtual components 60. It is possible to see, above the object 100, single virtual components 60 that have apparently been "extracted" from the object 100 using the outlined method and are now depicted above the object 100 in a released arrangement.

In order to single out components or object elements of a particular group for a view, it may make sense to form groups of the virtual components 60. These groups can be visualized or highlighted by means of an additionally shown virtual menu or a selection of the respective virtual component. The selection can be made by means of direct marking or envelopment, e.g. with a lasso, a window, a 3D shape, a beam, a fan, a cone, a fishing rod with a 3D shape as a hook, etc. The mask thus created can also be inverted, for example. In this case, the highlighting can be produced by coloration or enlargement of the respective virtual component 60 and/or hiding of virtual components 60 in front. This approach further has the option of blocking the virtual components 60 that do not belong to the group from a selection.

Figure 12:
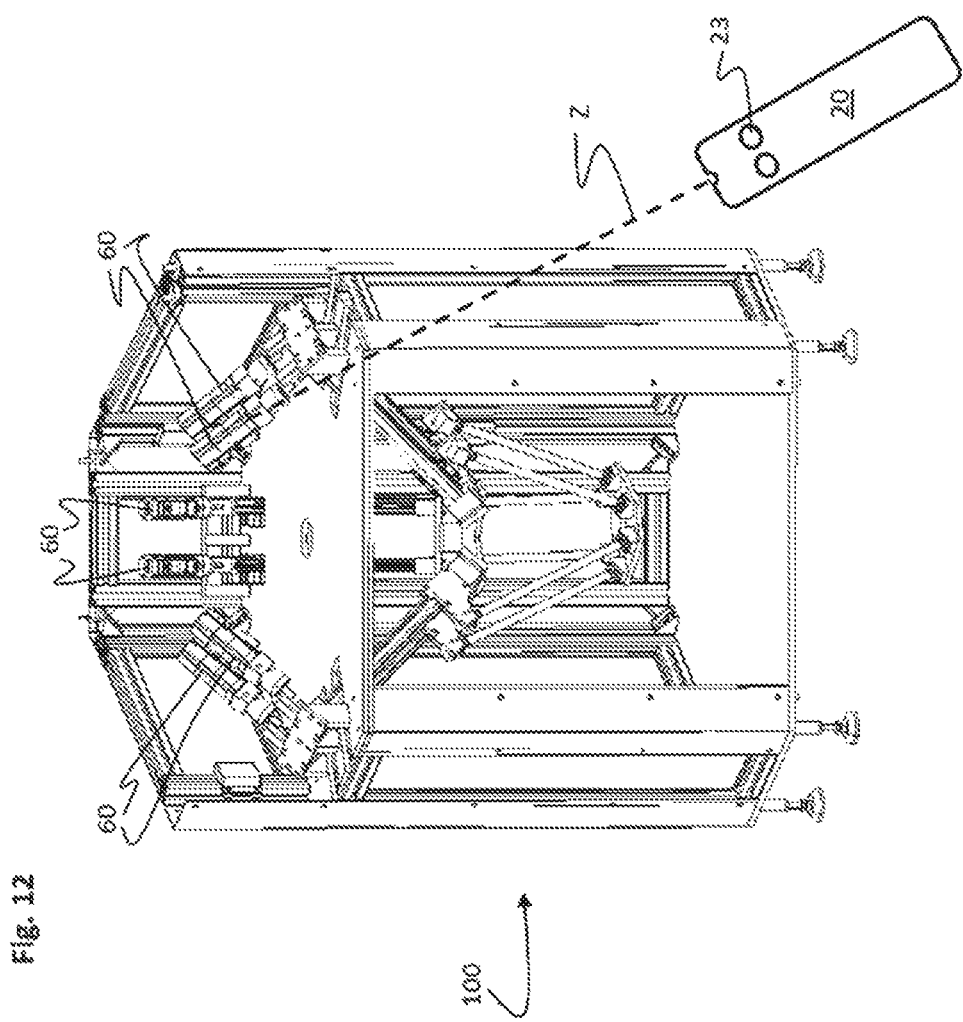
FIG. 12 shows exemplary singling-out of groups of virtual object elements or components of the object by selection of part of the group.

FIG. 12 shows such handling of the object 100 in the form of exemplary singling-out of groups of virtual components 60 from the object 100. The selection of a virtual component 60 by means of the virtual pointer Z visualizes the whole group of virtual components 60 for the user in the depiction device 10.

Zooming into or zooming out from subregions of the object 100 or full depiction of the object 100 can be effected with the aid of the virtual pointer Z in different ways. One option therefor is provided by the marking and registering of a point in the character space and the subsequent moving of the virtual pointer Z forward and backward. The latter can be achieved e.g. by means of an operator control element 23, for example in the form of a scrollwheel, touchscreen, slider, movement of a pointer device in the space, etc.

FIGS. 13 and 14 show exemplary zooming in of this kind on a virtual component 60 of the object 100 by means of an operator control element 23 of the operator control device 20.

In addition, zooming in on real regions of the object 100 is conceivable. To this end, the virtual pointer Z is used to select a detail from the range of vision of the depiction device 10, and said detail is depicted in an additionally shown region B, as indicated, in principle, in FIG. 15. It is possible to see a central region of the object 100, which object is selected by means of a virtual pyramidal pointer Z. At the top right of the figure, it is possible to see that this region B has been zoomed in on and is depicted, by means of the depiction device 10, such that details of the selected region of the object 100 are depicted using a higher resolution.

A further function of the virtual pointer Z for navigation and operator control lies in the use thereof as a guide line. To this end, projection areas, the center or the axis of rotation of objects 100 can be tied to the virtual pointer Z. This kind of fixing and/or orientation allows the objects 100 to be subsequently displaced or positioned along the virtual pointer Z or the guide line and relative to the real space.

A view behind a concealed object 100 can be provided not only by the methods already explained but also easily by means of an "X-beam function" of the virtual pointer Z. Such a view can be provided most easily by a cone of light that has its axis of rotation tied to the virtual pointer Z. In a region where the light of the cone of light strikes the object 100, one or more layers of the virtual object 100 or of a 3D model is/are automatically hidden and thus the virtual components 60 behind said layer(s) are visualized.

FIGS. 16 and 17 show such scenarios. In FIG. 16, it is possible to see that a region of the object 100 is to a certain extent virtually "X-beamed" by means of a conical pointer Z and depicted in enlarged form by means of the depiction device 10. In this manner, the operator control device 20 can be used to provide realize a magnifying glass function.

FIG. 17 shows that two regions of the object 100 are virtually X-beamed by means of two pyramidal virtual pointers Z and are depicted in enlarged form in two regions B in the depiction device 10.

It is also possible for a virtual pointer Z to be fixed on a virtual and/or on a real object 100. In this manner, an autoguiding function can be realized, for example. As an exemplary instance of application, FIG. 18 shows a drilling machine BM as a pointer-generating object with a virtual pointer Z fixed thereon, said pointer being oriented to a location for a drill hole that is to be made. In this manner, the user can easily tell at what location on the object 100 the drill hole is meant to be drilled by means of the drilling machine BM.

As already mentioned above, the virtual elements or components 60 of the objects 100 or the virtual maps of the physically existent real objects 100 are selected from the real space via the virtual pointer Z, which may be configured in different forms. For this purpose, the origin and the orientation or the form of the virtual pointer Z can be shown in the depiction device 10 so as to be visible to the user. The orientation of the virtual pointer Z to an object 100 or an object group that are mapped in the character space allows the object or the object group to be selected.

A further option for selecting objects consists in depiction by means of a scan. The scan can firstly be performed by the objects themselves or by a defined scan template (mask). Once such a scan is activated, the virtual pointer Z can no longer be guided smoothly through the space or the depiction of the object. To some extent "in the style of a magnet", the virtual pointer Z is attracted by the cubes of the scan or by the scan by means of the objects, as a result of which the virtual pointers Z are curved toward the components 60 of the object. This mechanism can facilitate the selection of the components of the object or the orientation of the virtual pointer Z considerably.

FIG. 19 shows such an instance of application, wherein an original orientation of three virtual pointers Z is depicted, the actual virtual pointers Z being "bent" to a certain extent toward the virtual components 60 of the object 100. In this case, the virtual components 60 act in the style of a magnet, as a result of which the virtual pointer Z is attracted. Ultimately, this means that the virtual pointers Z jump from one virtual component 60 to the next virtual component 60 and thereby facilitate the selection of the individual virtual components 60.

FIGS. 20 and 21 show a scan of an object 100 by means of cubes 26 of different size, the scan in FIG. 20 being configured larger than that in FIG. 21. The cubes 26 of the scan can in this manner be used for better orientation within the object or for better selection of the virtual components 60 of the object 100.

FIG. 22 shows a variant for a scan of an object 100, it being possible to see in the right-hand section of the figure a region B of a virtual display in which the scanned virtual component 60 of the object 100 is displayed. The changing of a location of virtual components 60 of the objects 100 can be performed easily with the aid of the virtual pointer Z. To this end, the desired object is marked and is fixed to the virtual pointer Z. Subsequently, said object can be displaced and deposited in the character space by changing the orientation and the origin of the virtual pointer Z. Once the object is tied to a certain location, or rotatably mounted, the displacement is translated into a rotational movement of the object.

A change of location of a virtual component 60 of the object 100 is also conceivable. To this end, there is provision for the virtual component 60 to be fixed with the aid of the virtual pointer Z and rotated through a defined angle α. This results in the virtual component 60 now being separate from the object 100 and, in this manner, being even better identifiable on the depiction device 10.

Besides the option of selecting the object 100 by means of the virtual pointer Z, previously defined pointer paths can trigger different actions of the object 100. If, by way of example, the orientation to the object is performed in the form of an X-shaped movement, said movement is hidden. In this case, the operator can draw an X symbol on the object. These movements or a route for how the virtual pointer Z strikes the object can also be shown as required.

To this end, there is provision for a virtual component 60 to be selected with an X-shaped pattern of movement of the operator control device 10 or the pointer Z. This results in the virtual component 60 being erased or no longer displayed in the depiction device 10.

The changing of the location of the pointer-producing object or device can also trigger defined actions. In this manner, it is possible, by way of example, to rotate the pointer-producing object or device about the pointer axis in order to rotate the virtual object as well.

To this end, there is provision for the virtual pointer Z in a first position to select a virtual component 60. Subsequent rotation of the operator control device 20 through a certain angle results in the virtual component 60 also being rotated in line with the rotation of the operator control device 20. It is also conceivable for a virtual object in the character space to be divided into different subregions. Depending on which of these subregions the virtual pointer Z is oriented to, different actions can be performed on the object 100.

As a simple example, a simple cube can be cited in this regard, said cube being divided into four subcubes. If the virtual pointer Z is directed at one subcube of the virtual component 60, displacement of the virtual component 60 can thus be performed. If, by contrast, another subcube is sighted, then a menu 21 containing current data for the real component that corresponds to the virtual component 60 automatically opens. If the virtual pointer Z is oriented to another subcube, then all other comparable objects are highlighted or selected in the depiction device 10, for example. According to this schema, it is advantageously possible to realize different actions and selection options for different components of the object.

On the basis of a cutting or orientation position of the virtual pointer Z, different actions are possible with the virtual component 60. By way of example, an orientation of the virtual pointer Z in the top left region of the virtual component 60 allows the virtual component 60 to be moved. An orientation of the virtual pointer Z on the bottom right region of the virtual component 60 prompts a menu 21 containing setting options to be opened that is able to be used to change technical parameters of the real component corresponding to the virtual component 60. The performance of these control actions is performed using a control device 30 that is functionally connected to the real component of the object 100.

In addition, it is also conceivable for an additional window to be superimposed on the object 100, wherein the window can be divided into further windows, actions defined by means of the windows being able to be initiated for the object 100.

In addition to the option for generating a single virtual pointer Z, there is also the option of generating and using multiple pointers Z that are generated using the methods explained above. This can prove useful particularly for multiple active users or autonomous machines or for extended operator control functions. In this case, one of the virtual pointers Z can also be generated remotely from the object 100 at a remote location, as a result of which the object 100 can be controlled by multiple virtual pointers Z or users, all virtual pointers Z being visibly depicted in the depiction device 10. This design can make sense e.g. for training purposes and/or for technical assistance of specialists remotely.

A further advantageous use of the method would be a user who has two pointer-producing operator control devices 20. Using a first virtual pointer Z1, the user can select a virtual component 60 of the object 100. Using a second virtual pointer Z2, the user can work on the selected virtual component 60 of the object or trigger further actions.

In an exemplary scenario of this kind, the first virtual pointer Z1 is generated by means of the depiction device 10 and the second virtual pointer Z2 is produced by means of the operator control device 20. Using a menu 21, the real component of the object corresponding to the virtual component 60 can be controlled by virtue of parameters of the virtual component 60 of the object 100 being changed or other actions being triggered.

In relation to objects that are in the character space and are connected to a real object by means of a control device 30, it is conceivable to use really existent and known physical variables, parameters and states and to alter the virtual map accordingly. By way of example, in this manner it is possible to use a defined color (for example red) to color a motor of a machine that has run hot and to depict said motor in enlarged form.

This results in an exemplary scenario of a dynamic change of object on the basis of the physical variable temperature. A display 24 shown in the depiction device 10 is used to signal that the real component of the object 100 corresponding to the virtual component 60, in the form of the motor, has a temperature that is e.g. greater than 100° C.

The guiding of the virtual pointer Z through the character space 80 with purely virtual objects gives rise to movement information. This information can be recorded and transferred to a real robot that then goes through this movement information or these paths of movement on the real object 100. In this manner, a kind of pointer-defined programing of motion sequences of an object 100 is supported. In addition, it is also possible for a cone of light from a Moving Head, tracker, etc. or projector image to use the movement information by means of a transformation via actuated light source.

In an exemplary scenario of this kind, the operator control device 20 is used to draw a specific pattern of movement on the object 100. A motion sequence is then carried out on the object in line with the "programmed" pattern of movement.

Drag and Drop is a known functionality that lends itself to a multiplicity of applications of the method. By way of example, it is thus possible to deposit parameters for a really existent object in a virtual object or in a display window. If a "parameter object" of this kind is now selected by means of a virtual pointer Z and dragged to an object that can assume these parameters using Drag and Drop, then said parameters can be adopted by the object without further action.

In a scenario of this kind, a virtual pointer Z generated by the operator control device 20 is directed at a parameter object 25. Using Drag and Drop, the parameter object 25 is dragged to the virtual component 60 of the object 100, as a result of which the parameters of the parameter object 25 are transferred to the real component of the real object 100 corresponding to the virtual component 60. As a result, it is an easy matter to transfer, for example, parameters that represent acceleration, deceleration and load curves, etc., to a component of the object 100 that is configured as an electric motor.

Further, direct adoption of the parameters of a parameter object 25 can also be realized in this manner. In the event of pointing, for this purpose, for example in a "parameter mode" of a virtual pointer Z, to a parameter object 25 having defined parameters and said parameter object being guided to an object using Drag and Drop, the parameters of the parameter object 25 are thus adopted for the object 100.

In this context, display of current data or possible actions can also be realized via a virtual display additionally displayed by means of the depiction device 10. To this end, the user guides the virtual pointer Z from the chosen object into the virtual display using Drag and Drop. Subsequently, current data or further selection options in relation to the object, for example, are shown on said virtual display.

In a sequence of this kind, the virtual pointer Z is used to select a virtual component 60 that is virtually displaced to a display 24. As a result, associated specific data, such as e.g. a data sheet, an order number, a trend in a characteristic quantity, various parameters or relationships, etc., for the virtual component 60 are displayed to the user on the display 24. To facilitate operator control, a help text, e.g. with the content: "Please insert object here", can be displayed in the still empty display 24 in advance.

Parts of an installation/machine/stage and/or of a building are normally connected to one another electrically, mechanically and/or via a piece of logic in a computer program and in this manner form a "causal object". These relationships are often known in CAD and software development environments. In connection with augmented reality, the cited causalities can be deposited with the objects. The selection of an object using the methods and processes described here allows an underlying causal chain to be automatically depicted or the participants connected to the selected object in a causal group to be shown.

In an exemplary scenario of this kind, the virtual pointer Z is directed at a virtual component 60 in the form of a motor of a training robot, the "causal chain" functionality being activated in a display 24, as a result of which three displays 24 arranged below the latter are automatically depicted. The user can now select from the causal chain either a mechanical, electrical or logical causal chain. If the user chooses the mechanical causal chain, then the NC axle combination and the mechanical coupling thereof are automatically depicted. By way of example, all of the elements of the mechanical causal chain are depicted in a standard color, for example red, in this case.

If the user selects the logical causal chain in a display 24, however, he is then taken to a further menu. He can now choose the menu item "clearance chain" and subsequently "software", for example. This shows a software development environment of the object in debugging mode and it is possible to perform a cycle of a software program of the object with branching into individual program lines.

Further exemplary application of the proposed method that can be cited is a field bus system having multiple field bus subscribers. If a field bus subscriber is chosen in causal mode, for example, the user is asked to choose between "direct" or "field bus". If the user chooses the former, the field bus subscriber is shown with the further causal chains thereof. If the user chooses "field bus", on the other hand, all subscribers that have the same field bus master as the chosen subscriber are shown and/or highlighted.

In an exemplary scenario of this kind, the virtual pointer Z is used to select a field bus subscriber (e.g. a temperature input card of a programmable logic controller PLC) of a field bus system. A display 24 can be used to display settings and data of the selected field bus subscriber. In this manner, simple and convenient analysis of complete logic chains for components of a field bus system is possible.

On the basis of the objects and/or groups of users, there may be provision for only a restricted operator control or navigation functionality to be realizable. These specific properties can be taken from the objects to which the virtual pointer Z is oriented, for example, or are generally dependent on the respective user who is registered in the system. The properties of one or more virtual pointers Z may also be dependent on the depiction device 10 used. If the depiction device 10 used is a tablet, for example, then the absolute value of the virtual pointer Z may be spatially limited. When semitransparent video goggles are used, the virtual pointer Z can be provided with its maximum spatial characteristic. Advantageously, the virtual pointer Z can assume different geometric forms, such as beam-shaped, pyramid-shaped, wedge-shaped, fan-shaped, loop-shaped, rod-shaped, etc., for example.

By way of example, there may also be provision for the virtual pointer Z to change in line with a parameter of the real space, for example to assume different lengths on the basis of temperature, humidity, time of day, brightness, etc.

A further simplification of the operator control and the navigation can be achieved by means of depiction devices or user interfaces, such as a human-machine interface (HMI) or a graphical user interface (GUI), for example, being shown in the depiction device 10 for the augmented reality space and/or the character space 80.

One option for this is to show a virtual display that displays the human-machine interface of the respective installation/machine/building/stage. This kind of visualization can advantageously replace or augment the regular construction of displays in installations. A machine operator can in this manner walk from machine to machine on a production line, for example, and automatically have the virtual displays of said machines shown in his depiction device 10 and operate the relevant machine by means of the human-machine interface shown. This is effected by virtue of the functional linking of the operator control device 20 to the control device 30 by means of which the respective installation/machine is physically controlled.

In an exemplary scenario of this kind, a display 24 in the form of a human-machine interface with a user menu is shown in the depiction device 10 and can be used to control the object 100 with its components.

In a further scenario of this kind, an object 100 is controllable from a switchgear cabinet. In this case, there is provision for selection of the switchgear cabinet by means of a virtual pointer Z to prompt a display 24 in the form of a virtual user menu with various operator control elements to be displayed for the object 100.

In this context, in addition to operator control by means of the pointer Z, direct linking of a conventional keyboard and/or mouse to a virtual user menu of this kind is also conceivable. To this end, the user can select the cited virtual equipment and use a submenu to activate a wireless or wired mouse and/or keyboard that is functionally connected to the virtual display/human-machine interface/user menu. In this case, it is also possible for a respectively different functionality of the different input devices to be provided for different user menus.

It is also conceivable for a human-machine interface to be shown in the depiction device 10. This can be done automatically depending on the orientation of the virtual pointer Z (or of the operator control device 20 or the depiction device 10) or by virtue of the human-machine interface being fixed in the depiction region. In this case, there may also be provision for multiple human-machine interfaces to be depicted in the depiction region of the depiction device 10. With this style of depiction by means of human-machine interface too, it may make sense to assign keyboard/mouse or other input equipment.

In connection with operator control options, there may also be provision for a virtual operator control screen (touchscreen, not depicted). Gesture recognition for a hand or multiple hands of the user(s) can be used to effect the actual operator control besides the other options already mentioned. This allows some advantages to be realized, and in this manner it is possible to avoid e.g. known problems with conventional operator control screens (e.g. cleaning effort, touch insensitivity, etc.) because the virtual operator control screens do not have such effects. Further, it is possible to realize implementation of a known gesture control (e.g. swiping, zooming, rotating, etc.), as is known from the operator control of mobile electronic terminals, for example.

It is also conceivable for a display or a graphical user interface GUI to be shown on a really existent touchscreen. In this case, the content of the graphical user interface GUI is projected onto the really existent touchscreen by means of the depiction device 10. The really existent touchscreen can accept the inputs of the user as during its customary operation. Mobile touchscreens that are connected to the depiction device 10 in the form of data goggles directly via a data channel (not depicted) are also conceivable.

Virtual pointers Z can, in addition or as an alternative to the aforementioned options, also arise from virtually augmented or real objects and are in this manner not necessarily tied to a presence of an operator control device 20. In this case too, the virtual pointers Z can have specific properties, e.g. be in dynamic form.

In this case, it is also possible to couple an object and/or the properties thereof to the data of one or more control devices. As a result, the location and orientation of an object in the space may be coupled to a (really existent or virtual) drive axle or kinematics, for example. Changeover of an object type or production or erasure of objects by means of a control device is also conceivable.

In the depiction device 10, it is possible for a really existent conveyor belt and virtual objects 83 arranged thereon in the form of workpieces to be depicted. If a movement by the conveyor belt is prompted via a control device, then the location and position parameters of the virtual workpieces are accordingly changed as well. In this manner, it is advantageously possible to check a conveying capacity or a spatial relationship between the conveyor belt and the workpieces to be conveyed thereon right in an early project phase.

Markers, anchors or marking elements 40 are understood in connection with augmented reality to mean usually defined, at least two dimensional maps, such as e.g. rectangles, circles, cubes or specific clearly defined geometric objects. These can be captured by one or more cameras 50 arranged in the space or on a depiction device 10 and processed further. As a result, it is possible to determine a position and orientation of the camera 50 in relation to the captured object 100.

Particularly a passive characteristic of these marking elements 40 can have an adverse influence on capture thereof in the event of adverse lighting or adverse incidents of light. Active variants for the marking elements 40, which are connected to other equipment or to one another via a communication channel, are therefore also conceivable.

These active marking elements 40 have e.g. LED panels arranged together that together form a matrix. The light emitted by the LED panels can in this case have wavelengths in the visible range and the invisible range. A camera can be used to capture the relevant wavelength, and there can be a reaction thereto. In order to largely rule out any optical reflections occurring, there may additionally be provision for the use of polarization filters.

Furthermore, marking elements 40 are also possible that are illuminated at the rear. In this case too, there may be provision for the use of light sources that emit invisible or visible light.

Marking elements 40 in the form of LED light chains with visible or invisible radiation may be arranged particularly in corner regions or contours of premises and objects.

A further option for the use of marking elements 40 consists in their being used in a machine/object. In this case, there may be provision for the marking elements 40 to be arranged in an outer border region and/or inside the object.

Active marking elements 40 can form a code that is produced by means of cycling of the light source. In this manner, it is advantageously possible to use a constant characteristic of the marking element 40 to generate different codes. The marking elements 40 can in this manner be identified e.g. by means of their individual flash code.

Various architectures for a software-oriented and hardware-oriented design of the proposed augmented reality system are conceivable, but such a system contains at least one depiction device 10, by means of which the character space 80 is mapped, and an operator control device 20 or a pointer-generating object or a virtual pointer Z.

Figure 23:
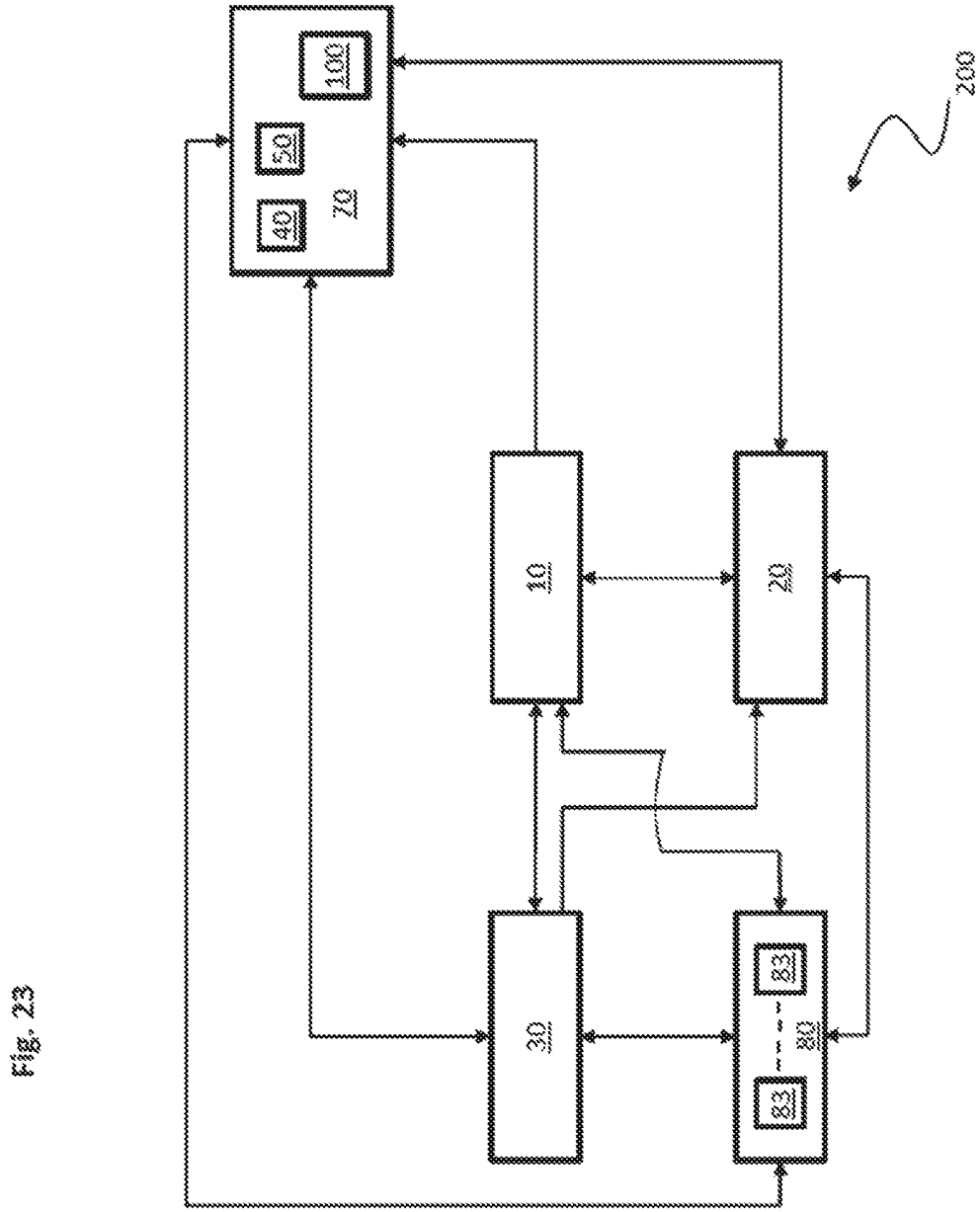
FIG. 23 shows an example of possible linking between hardware and software for carrying out the proposed method.

The block diagram of FIG. 23 schematically shows devices of a system 200 for controlling an object 100. Possible connections or communication channels between the devices are depicted in the form of arrows. It is possible to see an augmented reality depiction device 10 that is functionally connected to an operator control device 20 and to a control device 30. The operator control device 20 is functionally connected to the real space 70 with a real object 100 arranged therein and to the character space 80 with virtual objects 83 arranged therein. Further, the control device 30 is connected to the real space 70 and to the character space 80 in a bidirectional manner.

The control device 30 can perform multiple tasks, since it normally has the greatest computational power of all devices of a system 200 of this kind. As such, it may be provided for evaluating camera and/or sensor systems in the real space 70, in the depiction device 10 and in the operator control device 20. Optionally, at least partial relocation of the cited functions to the respective equipment may also be possible.

Optionally, the character space 80 can be integrated into the control device 30 (not depicted), the control device 30 being able to perform the transformations necessary for that purpose. A further task of the control device 30 may be to ascertain the virtual objects that have been selected by means of the virtual pointer Z.

A substantial task of the control device 30 is to actuate the physically existent real objects 100 in the real space 70. To this end, the control device 30 is connected to the actuator and sensor systems (not depicted) of the objects 100 in the real space 70 via a communication system e.g. in the form of an analog line (not depicted). The control device 30 may be unidirectionally or bidirectionally connected to all other subscribers 10, 20, 70, 80 of the system 200 that have a communication channel.

The real space 70 or physical space includes real objects 100 that are connected to the control device 30. Said objects 100 may be sensors, actuators, depiction and operator control units, motors, etc., for example.

The real space 70 can optionally have marking elements 40 and/or cameras 50 arranged in it. The real space 70 can further optionally also have sensors and/or transmission units mounted in it that are connected not only to the control device 30 but also to the operator control device 20 and/or to the depiction device 10.

The character space 80 may be depicted at least in part in the depiction device 10 and in this manner superimposed on the real space 70. The character space 80 includes virtual objects 83 that may be connected to a real object 100 of the real space 70 via the control device 30, the depiction device 10 and the operator control device 20. Ultimately, in this manner an object 100 of the real space 70 is to a certain extent "augmented" with the virtual objects 83 of the character space 80, or has these superimposed on it, in order to form an augmented reality. In order to facilitate navigation through the character space 80 and within the character space 80 and also operator control of the virtual objects 83 included therein, the virtual pointer(s) Z generated can be incorporated into the character space 80 as virtual objects 83.

The depiction device 10 can contain the control device 30 and/or the operator control device 20 (not depicted). Primarily, however, it is provided for the purpose of visibly depicting the real space 70 in combination with the virtual objects 83 of the character space 80 for the user. It is also conceivable for the depiction device 10 to be used to depict exclusively the character space 80.

In an expansion stage, the depiction device 10 has the necessary sensor system to detect its position and location or orientation in the real space 70 or relative to the object 100.

In an extended expansion stage, the depiction device 10 can have additional sensor systems in order to detect the position and orientation of a virtual pointer Z or of the operator control device 20 relative to the depiction device 10. In this case, it is also possible for the already existent sensor system of the depiction device 10 to be able to undertake this task.

The operator control device 20 may be configured as a standalone device. It is functionally connected to the control device 30 and/or to the depiction device 10. The operator control device 20 can further optionally have marking elements 40, transmission and/or reception units and also a sensor system for position and location detection. Furthermore, the operator control device can have at least one operator control element 23 in the form of keys, touchpads, scrollwheels, etc. (not depicted).

A pointer-generating object is a physically existent real object that has no communication channel. For example, a stick or a hand can represent a pointer object of this kind. The location and position parameters of the pointer-generating object can be ascertained via a camera system, as a result of which the virtual pointer Z is generated.

Some instances of application of the proposed method are explained in more detail below.

As already explained above, an augmented reality depiction device can replace or extend a touchscreen or even a mobile panel. Alternatively, an already existent display can be extended by the "Augmented reality" functionality. Operator control by means of a virtual pointer Z opens up totally new approaches in this case. Intuitively concatenated object structures can be used to lead a user through the machine/installation/building, with complex structures being "broken up" to a certain extent.

Virtual tracking of a process really taking place or of a workpiece being worked on is also advantageously possible in this case.

In the event of a fault or in the event of warnings, the affected installation parts can be visibly highlighted for the user and the current data or data sheets of said installation parts can be intuitively retrieved without the user having to laboriously scroll through various submenus.

In the area of support, augmented reality can entail wide-ranging advantages. Particularly the described causal objects in combination with an operator control pointer allow intuitive troubleshooting that is based on current data. Assistance with assembly work is also advantageously possible thereby.

Particularly involvement of experts can be substantially improved by augmented reality and by means of the above-described operator control and navigation device directly for an installation that is to be inspected. The augmented reality space can, to this end, be transmitted via a cloud or directly. In this manner, the expert has the possibility of seeing the same image as a person at the installation to be inspected in situ. As a result of coupling of an operator control device of the remotely seated expert to the installation to be inspected, said expert can navigate through the installation and advantageously assist the person in situ, e.g. in troubleshooting or product training.

Fundamentally, robots today are taught purely virtually or by hand. Teaching in the augmented reality space is barely existent at present and is rather the subject of research at present. Augmented-reality-based teaching of robots can entail considerable advantages, however. On the one hand, it allows paths and positions of the robot to be depicted in the space by means of the virtual pointer. On the other hand, the scenario of teaching the robot can be provided or simulated in the real environment, specifically without a really existent robot and/or workpieces.

Particularly in initial phases of projects, it is difficult to involve automation engineering in optimum fashion. The integration of augmented reality in the development process allows the automation engineering to be involved in the respective project right at an early stage. As such, it is possible, by way of example, to use 3D models in order to check first code executions and architectures.

Further, a partly finished installation can have parts that are still missing added in a virtual manner. This allows a PLC program, for example, to be tested already on the almost finished installation itself.

In parallel therewith, a combination of augmented reality and programming languages is also conceivable. If a switch of a machine is selected, for example, then said switch can be connected to a software object that e.g. may be a function block according to IEC specification 61131 or 61499. This may also be possible vice versa, with a programmer selecting an input at software level and subsequently a physical, data-delivering element. This can also be realized with outputs, actuators, sensors or also data points from logs and databases.

A data-flow-oriented or model-based, in particular a substantially graphical, programing language (for example BPML, EPK, CFC, UML, National Instruments LabView, MatLab Simulink, etc.) is also suitable for this purpose.

Hardware-software linking is possible by means of the method. To this end, the operator control device 20 is used to generate a virtual pointer Z that is directed at a second sensor of an object 100 in the form of a technical installation. An output of a first sensor of the installation may be routed to a logic AND depicted by means of the depiction device 10. By pivoting the operator control device 20 and hence the virtual pointer Z, Drag and Drop is used to drag the second sensor to a second input of the logic AND, as a result of which ultimately electrical linking of the two signals from the two sensors is performed on the installation in line with the logic AND. The control device 30, which is functionally connected to the operator control device 20, is used to perform the logical interconnection explained on the installation in real terms.

In connection with reality, the proposed method can be used to improve the comprehensibility of virtually performed simulations. By way of example, an only partly constructed installation can be completed virtually and, as a result, simulated in a full configuration. E.g. dry runs on machines with virtual workpieces, as has been indicated by way of example further above, are conceivable.

Particularly during different phases of the development, machines, electrical and automation engineers can use already finished 3D models to simulate parts of the installation. It is also possible for the purchaser of an installation to be provided with a view of a virtual map of the finished part of the installation.

In areas of intralogistics, it can often make sense to create virtual layout plans of machines, installations and entire production lines and halls. Disadvantageously, these plans can often differ from real circumstances. Parts of production process controllers (e.g. Kanban system, Vendor Managed Inventory, etc.) can be matched to a daily workflow and have their position altered using the proposed method. However, the discontinuous capture of objects, workstations and frequented paths can also lead to problems during planning.

Augmented reality allows substantial advantages to be attained here. If there is an intention to purchase a new installation, for example, said new installation can be planned with its actual dimensions in the real space. In this manner, it is possible to produce a virtual image of the real circumstances in connection with the new installation very realistically. It is also possible for a simulation of said new installation, including supply and discharge zones, to be realized in a simple manner. The operator control and navigation by means of one or more virtual pointers Z assists intuitive handling of the installation.

Assistance systems are already known particularly in automotive engineering. It is conceivable to use, in the augmented reality space, a proposed system that is equipped with the navigation and operator control designs described above, with the aid of virtual pointers for an assistance system.

One example of such an application can be regarded as operation of an excavator on a building site. For this purpose, surveyors mount marking elements 40 at known positions on the building site. Further, multiple marking elements 40 are mounted on windows of a driver's cab and on the boom of the excavator. The excavator driver uses a depiction device 10 in the form of semitransparent goggles. The semitransparent goggles are used to generate multiple virtual pointers Z. On the one hand, the boom and the excavator bucket of the excavator are generated virtually in pointer form, and on the other hand, the line of vision is ascertained via the position and location vector of the semitransparent goggles. Lines that are already existent in reality and the trench that needs to be dug are available in a geographical information system. This information is shown visibly to the excavator driver in the semitransparent goggles. If the excavator bucket deviates from the prescribed route or an existent line threatens to be touched, the directions of movement of the excavator bucket and/or the speed of the excavator is then automatically restricted.

The use of augmented reality in connection with one or more control devices allows the following scenarios to be realized, for example by means of the functionalities described above:

The 3D information for a building that is included in a BIM or a CAD model, for example, allows programing to be configured interactively. A programmer is shown electrical, pneumatic and hydraulic lines and devices in a visible manner on the depiction device 10 via the superimposition of the information. The use of the virtual pointers Z allows a logical connection to be made for multiple devices.

By way of example, a virtual pointer Z first of all points to a lamp, subsequently to a switch and subsequently to a connection point on a control device. In this manner, the control device "knows" that the switch for the lamp is connected to the relevant contact point. The connection information can be used to ascertain functional data, for example from the BIM model for an applicable piece of control logic.

A further instance of application can involve one or more control devices in a building identifying one or more malfunctions and communicating solution proposals and operating states to the user via the augmented reality devices. By way of example, a controller notices that there has been a relatively long deviation in the temperature from an actual value in a space. The user of the augmented reality device is then shown all data from the power transmission paths that are needed for a diagnosis visibly in virtual form. As a result, the inlet and outlet pipes of the heating circuit can be visualized with their respective temperatures, flows and energy volumes, for example. The interactions with the virtual pointer can then be used to perform test scenarios live and by advance simulation for the purpose of more accurate fault diagnosis.

In the area of lighting design shading, the users of a space can use augmented reality to be provided with a depiction of the path of the sun over a time window and can individually adapt the shading conditions by means of the pointer control connection. The control device stores the settings taught. Hence, optimized protection against the sun can advantageously dispense with long observation and individual changing of shading scenarios.

The use of augmented reality in bidirectional functional connection with one or more control devices allows the following scenarios to be realized with the functionalities described above, for example:

During an actual construction phase for a stage, the 3D information and the use of augmented reality can be used to program or readjust axis-based lamps. Using the virtual pointer, the user selects e.g. an as yet nonexistent lamp and configures and positions the desired effect beam in a virtual manner. The control device stores this information for real operation as soon as the lamp is correctly installed.

In improvisation theatres, actors can use the pointers and their positions to predefine scenarios in augmented reality in the short term, said scenarios subsequently being reproduced by the control device via a defined event. It is alternatively also conceivable for the retrieval of scenes or time programs to show the user the subsequent scenes in augmented reality, with e.g. paths of travel being depicted that the user can also interactively alter at a later time. By way of example, there may be an area provided in an amusement park in which, by way of example, effects such as e.g. fog, lighting effects, air currents, etc. individually affect the respective adventure world of the individual user in the form of augmented reality in a specific manner. In this way, different operations of the amusement park can run with respectively different contents for different users at the same time. Using the pointers of the operator control devices, the user can start further interaction that affect the individually set augmented reality of the user.

Particularly in the case of training in the area of automation engineering, it is often difficult to establish a relationship with the real machines/installations. In this case too, augmented reality provides options for counteracting this circumstance. By way of example, a virtual robot can be functionally linked to really existent motors. In this manner, every training participant has the opportunity to program a robot of his own independently.

An exemplary training structure that has already been explained comprises an augmented reality, depicted by means of a depiction device 10, with a real buckling arm robot, a real conveyor belt and virtual workpieces.

This principle can also be applied to the area of building engineering. The virtual map of a building with its trades can be virtually linked to the components of the control engineering of the building. In this manner, each participant can automate control engineering for his own building.

Particularly in large factories or in computer centers, there is often insufficient clarity with regard to signal lines and a volume of data transmitted thereon. Dimensioning of said lines and of the volumes of data and also authorization management are therefore linked to considerable expenditure. The proposed method can be used to set up a network and to design the desired data and the structures thereof efficiently. To this end, the real data links in the real environment have virtual elements superimposed on them. In this connection, it is conceivable for a virtual server, a cloud or a locally remote computation installation to be shown.

By drawing lines (Point-to-Point), it is possible in this manner to connect the data from machine to machine or to the cloud. The underlying automatism then links the data points accordingly. In the absence of access authorization, the relevant certificate or the access data are requested automatically. An already existent network infrastructure can also be integrated into an augmented reality system of this kind.

Existing connections and structures can be diagnosed online by using the virtual pointer to point to the virtually augmented connection. Subsequently, all of the communication channels (for example TCP/IP, CANopen, EtherCAT, EAP, etc.) are depicted. The respective data points can then be tapped off and possibly additionally diverted to a diagnosis database. Suitable analysis methods, such as comparison of data points by means of regression, for example, can also be performed in this context.

The text below explains possible steps for how augmented reality can be used to perform a transmission of system process data to the cloud. To this end, the network with the desired data is first of all selected in a first step by means of the virtual pointer Z formed by the operator control device 20. Subsequently, in a second step, the available data channels from the point of view of authorization are shown in the depiction device 10 so as to be visually visible. Following selection of the suitable data channel by means of the virtual pointer Z, the available data points are displayed in the depiction device 10. Following the selection of the data point(s), the latter can be transmitted to the could by means of Drag and Drop. All of the cited steps may be tied to specific authorizations of the operator.

Figure 24:
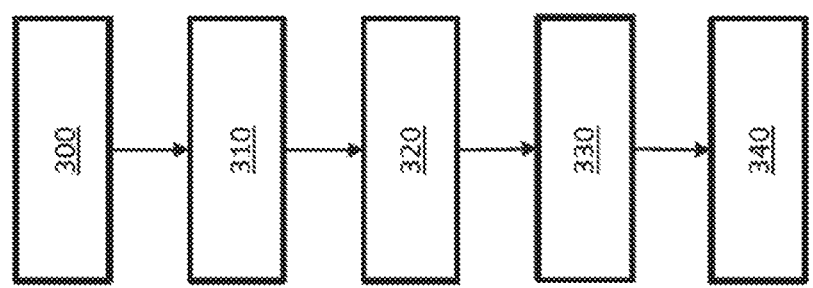
FIG. 24 shows a schematic functional sequence of an embodiment of the method according to the invention.

FIG. 24 shows a basic sequence for an embodiment of the provided method for controlling an object, wherein the object 100 is arranged in the real space 70 and is linked to at least one element of a character space 80, wherein the object 100, a depiction device 10, an operator control device 20 and a control device 30 are functionally connected to one another.

In a step 300, ascertainment of a position and an orientation of the operator control device 20 and/or of the depiction device 10 in relation to the object 100 is performed.

In a step 310, generation of a virtual pointer Z from the ascertained position and the ascertained orientation of the operator control device 20 and/or of the depiction device 10 is performed.

In a step 320, selection of the object 100 by means of the virtual pointer Z is performed.

In a step 330, depiction of the object 100, augmented with at least one element of the character space 80, by means of the depiction device 10 is performed.

Finally, in a step 340, control of the object 100 by means of the operator control device 20 is performed.

In summary, the present invention is used to propose a method and a system for controlling an object that efficiently apply the principles of augmented reality to real objects. For this purpose, an operator control and navigation design is provided by means of which objects are selected and depicted in a depiction device using augmented reality and are controlled by means of a control device in an efficient manner. A person skilled in the art will combine and/or modify the aforementioned features of the invention without departing from the essence of the invention.

The invention claimed is:

1. A system for controlling an object,
   wherein a plurality of objects are arranged in real space, each object being part of an autonomous machine and being linked to at least one virtual element of a character space,
   wherein the plurality of objects, a depiction device, an operator control device and/or a control device are functionally connected to one another, the operator control device being configured as an intelligent sensor and decision-making device of the autonomous machine,
   wherein the character space is integrated into the control device, the control device being able to perform the transformations necessary for that purpose,
   wherein the control device is connected to actuator and sensor systems of the objects in the real space via a communication system to actuate the objects in the real space,
   wherein the character space is depicted at least in part on the depiction device, the character space being superimposed on the real space,
   wherein the system is configured to ascertain a position and an orientation of the operator control device and/or of the depiction device in relation to the object,
   wherein the system is configured to generate a virtual pointer from the ascertained position and the ascertained orientation of the operator control device and/or of the depiction device,
   wherein the system is configured to select the object by the virtual pointer,
   wherein the system is configured to depict the object, augmented with the at least one virtual element of the character space linked with the object, by the depiction device, and
   wherein the system is configured to control the object by the operator control device, wherein the control device controls the object in line with a control command of the operator control device.

2. The system according to claim 1, wherein the virtual pointer has one of the following forms: cone, fan, lasso, beam, fishing rod with a 3D shape as a hook.

3. The system according to claim 1, wherein the virtual pointer is changed in line with a parameter of the real space.

4. The system according to claim 1, wherein the virtual pointer is produced with the aid of capture of an eye movement of a user.

5. The system according to claim 1, wherein the object is selected by the virtual pointer by performing a scan of the object.

6. The system according to claim 1, wherein at least two of the elements: depiction device, operator control device, control device are wirelessly connected to one another.

7. The system according to claim 1, wherein the operator control device is configured as a passive element.

8. The system according to claim 1, wherein the depiction device used is one from the following: data goggles, data lenses, tablet, television set, projector, mobile phone, smartwatch, panel PC, industrial PC, monitor.

9. The system according to claim 1, wherein the position and the orientation of the operator control device are ascertained by using at least one sensor arranged in the operator control device.

10. The system according to claim 1, wherein the operator control device is arranged in the depiction device.

11. The system according to claim 1, wherein an object in the form of a building and/or a machine is controlled.

12. The system according to claim 1,
   wherein the system is configured to select the object of the plurality of objects by the virtual pointer, wherein the object is selected by the virtual pointer by virtue of a scan of the plurality of objects being performed, wherein the virtual pointer being attracted by the elements in the character space linked with the objects in real space during the scan, the attraction resulting in a bending of the virtual pointer toward the element so that the virtual pointer jumps from one element to a next element.

13. The system according to claim 12, wherein the scan is carried out by a defined scan template.

* * * * *